US008694453B2

(12) United States Patent
Kitamura et al.

(10) Patent No.: US 8,694,453 B2
(45) Date of Patent: Apr. 8, 2014

(54) DIALOGUE CONTROL SYSTEM, METHOD AND COMPUTER READABLE STORAGE MEDIUM, AND MULTIDIMENSIONAL ONTOLOGY PROCESSING SYSTEM, METHOD AND COMPUTER READABLE STORAGE MEDIUM

(75) Inventors: Mihoko Kitamura, Kyoto (JP); Toshiki Murata, Kyoto (JP); Tatsuya Sukehiro, Osaka (JP); Sayori Shimohata, Saitama (JP); Ikuo Orihara, Saitama (JP); Atsushi Ikeno, Kyoto (JP); Shigehiro Kato, Tokyo (JP); Miho Tanaka, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 425 days.

(21) Appl. No.: 13/145,516

(22) PCT Filed: Dec. 15, 2009

(86) PCT No.: PCT/JP2009/070907
§ 371 (c)(1),
(2), (4) Date: Jul. 20, 2011

(87) PCT Pub. No.: WO2010/125709
PCT Pub. Date: Apr. 11, 2010

(65) Prior Publication Data
US 2011/0282913 A1    Nov. 17, 2011

(30) Foreign Application Priority Data
Apr. 30, 2009  (JP) .................. 2009-110637

(51) Int. Cl.
*G06F 17/00*  (2006.01)
(52) U.S. Cl.
USPC ........................................ 706/45
(58) Field of Classification Search
USPC ............................ 706/20, 45, 12
See application file for complete search history.

(56) References Cited

U.S. PATENT DOCUMENTS

2005/0278362 A1* 12/2005 Maren et al. ............ 707/100
2008/0016020 A1*  1/2008 Estes ....................... 706/52
2009/0228439 A1*  9/2009 Manolescu et al. ........ 707/3

FOREIGN PATENT DOCUMENTS

JP  2008-036342 A  2/2008
JP  2008-036356 A  2/2008

OTHER PUBLICATIONS

Riichiro Mizoguchi et al., "Foundation of Ontological Engineering: An Ontological Theory of Semantic Links, Classes, Relations and Roles", Journal of Japanese Society for Artificial Intelligence, vol. 14, 1999, pp. 1019-1032.
Sayori Shimohara et al., "Development of Domain Knowledge for Laddering Search Service and the Experiment using the Demonstration System", IPSJ SIG Technical Reports, vol. 2008, No. 67, Jul. 10, 2008, pp. 103-108.
Kazunori Komatani et al., "User Modeling for Adaptive Guidance Generation in Spoken Dialogue Systems", The Transactions of the Communication Engineers, vol. J87-D-II, No. 10, Oct. 1, 2004, pp. 1921-1928.

* cited by examiner

*Primary Examiner* — David Vincent
(74) *Attorney, Agent, or Firm* — Rabin & Berdo, P.C.

(57) ABSTRACT

A dialogue control system that uses an ontology that systematically expresses domain knowledge representing concepts and relationships between concepts to determine questions for a user and implements the questions, and implements a dialogue in accordance with received user answers. One or more dimension-classified ontologies and a basic ontology are stored, a concept from a user response is specified as a condition, and one or a plural number of the dimension-classified ontologies that meet the specified condition are fetched. The content of the fetched dimension-classified ontology/ies is overwritten on the basic ontology, in order according to dimension priorities from the dimension-classified ontology with the lowest dimension priority, and a multidimensional ontology is generated. The dialogue control system uses this multidimensional ontology to control the dialogue.

12 Claims, 32 Drawing Sheets

FIG.5

MULTIDIMENSION:

| DEFINITION RANGE | PROPERTY | VALUE RANGE | IMPORTANCE | PRIORITY | KIND OF PROPERTY | OPTIONS BASIC QUESTION TEXT | LINK TEXT |
|---|---|---|---|---|---|---|---|
| PERSON | PERSONALITY | PERSONALITY | 1 | 1 | GROUP | | |
| PERSON | INITIAL MOTIVATION FOR JOB CHANGE | REASON FOR JOB CHANGE | 1 | 0.9 | ACQUISITION TARGET | First, could you tell me in more detail about the circumstances that led you to look for a new job? | |
| PERSON | WORK EXPERIENCE | CURRENT WORK | 1 | 0.8 | GROUP | | |
| ... | ... | ... | ... | ... | ... | | |
| PERSONALITY | PURPOSE DURING SITE VISIT | PURPOSE DURING SITE VISIT | 1 | 1 | ACQUISITION TARGET | What is your purpose in visiting this site? | |
| PERSONALITY | CURRENT JOB | JOB | 1 | 0.9 | ACQUISITION TARGET | What is your current job? | |
| ... | ... | ... | ... | ... | ... | | |
| PERSONALITY | LIFE EVENT | LIFE EVENT | 1 | 0.6 | ACQUISITION TARGET | Please tell me about your current situation. | |
| CURRENT WORK | CUSTOMERS DEALT WITH | CUSTOMERS | 0.1 | 0.1 | ACQUISITION TARGET | What kinds of customers have you been targeting? | |
| CURRENT WORK | BUSINESS CONDITIONS EXPERIENCED | BUSINESS CONDITIONS EXPERIENCED | 0.1 | 0.1 | ACQUISITION TARGET | What kinds of products have you been dealing with? | |
| CURRENT WORK | SIZE OF EMPLOYING BUSINESS | SIZE OF BUSINESS | 0.1 | 0.1 | ACQUISITION TARGET | How big is your company? | |
| CURRENT WORK | CLIENT INDUSTRY | INDUSTRY | 0.1 | 0.1 | ACQUISITION TARGET | Which industry are the most of your clients in? | |
| ... | ... | ... | ... | ... | ... | ... | |

| MULTIDIMENSION: | | |
|---|---|---|
| CLASS | CLASS | ALTERNATIVE EXPRESSION |
| PURPOSE DURING SITE VISIT | WANT TO FIND OUT ABOUT SUITABLE JOBS | SUITABLE JOBS+FIND OUT\|JOBS THAT SUIT ME+FIND OUT |

CLASS DEFINITION AND ALTERNATIVE EXPRESSION DEFINITION FOR THE CLASS "PURPOSE DURING SITE VISIT"

INTENTION ANALYSIS RESULT

FIG.11

| MULTIDIMENSION: | | |
|---|---|---|
| CLASS | CLASS | OPTIONS |
| | | CHECK TEXT |
| PURPOSE DURING SITE VISIT | WANT TO FIND OUT ABOUT SUITABLE JOBS | Would you like to re-confirm your details? |

CLASS "PURPOSE DURING SITE VISIT" AND CLASS OPTION DEFINITION

FIG.14

| PATH REPRESENTING DIMENSION | VALUE TO BE SPECIFIED |
|---|---|
| /person/personality/life event | REDUNDANCY OR CORPORATE BANKRUPTCY |
| | BIRTH OF A CHILD |
| | ⋮ |
| /person/personality/current job | SALES |
| | SOFTWARE ENGINEER |
| | ⋮ |
| /person/personality/current industry | MEDIA |
| | PHARMACEUTICALS |
| | ⋮ |

FIG.15

```
/person/personality/life event=redundancy or corporate bankruptcy&&/person/personality/current job=sales
/person/personality/current job=sales
/person/personality/current industry=pharmaceuticals
```

EXAMPLE OF DIMENSION PRIORITY DEFINITION TABLE

FIG.17A

INFERENCE DEFINITION FOR THE DIMENSION
"/person/personality/current company type=foreign company"

| MULTIDIMENSION: /person/personality/current company type=foreign company |||||
|---|---|---|---|---|
| DEFINITION RANGE: /person/personality/current job |||||
| VALUE RANGE: /person/strong point/competencies |||||
|  | IT SKILLS | ENGLISH ABILITY | NEGOTIATION ABILITY | .... |
| SOFTWARE ENGINEER | 0.7 | 0.8 | 0.2 |  |
| SALES | 0.1 | (0.9) | (0.6) |  |
| .... |  |  |  |  |

FIG.17B

INFERENCE DEFINITION FOR THE DIMENSION
"/person/personality/current company type=venture"

| MULTIDIMENSION: /person/personality/current company type=venture | | | | | |
|---|---|---|---|---|---|
| DEFINITION RANGE: /person/personality/current job | | | | | |
| VALUE RANGE: /person/strong point/competencies | | | | | |
| | IT SKILLS | ENGLISH ABILITY | NEGOTIATION ABILITY | .... | |
| SOFTWARE ENGINEER | 0.9 | 0.2 | 0.7 | | |
| SALES | 0.2 | 0.3 | (0.9) | | |
| .... | | | | | |

FIG.17C

INFERENCE DEFINITION FOR BASE DIMENSION

| MULTIDIMENSION: | | | | | |
|---|---|---|---|---|---|
| DEFINITION RANGE: /person/personality/current job  VALUE RANGE: /person/strong point/competencies ||||||
| | IT SKILLS | ENGLISH ABILITY | NEGOTIATION ABILITY | .... | |
| SOFTWARE ENGINEER | 0.5 | 0.5 | 0.5 | | |
| SALES | 0.5 | 0.5 | 0.5 | | |
| ... | | | | | |

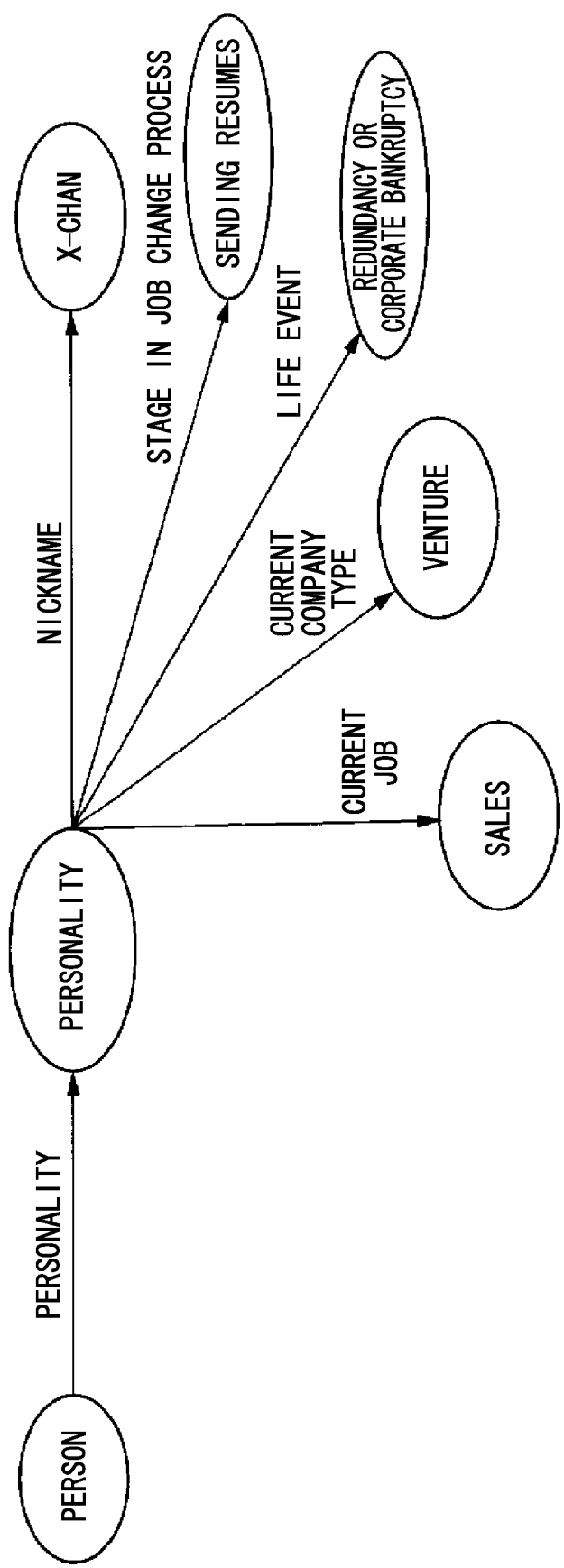

FIG.25

| MULTIDIMENSION: STAGE IN JOB CHANGE PROCESS=SENDING RESUMES&&LIFE EVENT=REDUNDANCY OR CORPORATE BANKRUPTCY&&AGE=40+ | | | | | |
|---|---|---|---|---|---|
| DEFINITION RANGE | PROPERTY | VALUE RANGE | IMPORTANCE | PRIORITY | BASIC QUESTION TEXT | LINK TEXT |
| PERSON | INITIAL MOTIVATION FOR JOB CHANGE | REASON FOR JOB CHANGE | 1 | 1 | Without being indiscreet, could you tell me more about the circumstances that led you to consider a job change? | "Hello %%name%%. It seems that your current state in the job change process is that you have been sending out resumes. You are really working at finding a new job, aren't you? I see that you have mentioned redundancy or corporate bankruptcy. Thank you for letting me know |

EXAMPLE 1 OF MULTIDIMENSIONAL PROPERTY DEFINITION

| MULTIDIMENSION: STAGE IN JOB CHANGE PROCESS=SENDING RESUMES&&LIFE EVENT=REDUNDANCY OR CORPORATE BANKRUPTCY | | | | | |
|---|---|---|---|---|---|
| DEFINITION RANGE | PROPERTY | VALUE RANGE | IMPORTANCE | PRIORITY | BASIC QUESTION TEXT | LINK TEXT |
| PERSON | INITIAL MOTIVATION FOR JOB CHANGE | REASON FOR JOB CHANGE | 1 | 1 | First, could you tell me more about the circumstances that led you to consider a job change? | "Hello %%name%%. It seems that your current state in the job change process is that you have been sending out resumes. You are really working at finding a new job, aren't you? I see that you have mentioned redundancy or corporate bankruptcy. Thank you for letting me know about that. Now we should take stock of your abilities and strengths, and together we will look for some new possibilities." |

EXAMPLE 2 OF MULTIDIMENSIONAL PROPERTY DEFINITION

| MULTIDIMENSION: | | | | | |
|---|---|---|---|---|---|
| DEFINITION RANGE | PROPERTY | VALUE RANGE | IMPORTANCE | PRIORITY | BASIC QUESTION TEXT | LINK TEXT |
| PERSON | INITIAL MOTIVATION FOR JOB CHANGE | REASON FOR JOB CHANGE | 1 | | Could you tell me more about the circumstances that led you to consider a job change? | "Hello %%name%%. Let's talk to one another and work out what you really want to do." |

EXAMPLE 3 OF MULTIDIMENSIONAL PROPERTY DEFINITION

FIG.26

| SR NAME | FREQUENT EXPRESSION LIST | FREQUENCY NUMBER |
|---|---|---|
| UNCERTAIN | WORRIED\|CONCERNED\|NERVOUS | 3 |

FIG.27

| USER DATA CLASS NAME | USER DATA PATH |
|---|---|
| UNCERTAIN | /user/emotion |

FIG.28A

| MULTIDIMENSION: STATE=UNCERTAIN | | |
|---|---|---|
| CLASS | CLASS | CHECK TEXT |
| REASON FOR JOB CHANGE | CORPORATE BANKRUPTCY | I'm sorry to hear that. Bankruptcies cause a lot of stress for everyone. I imagine you have a lot of worries about how you will maintain your standard of living. |

FIG.28B

| MULTIDIMENSION: | | |
|---|---|---|
| CLASS | CLASS | CHECK TEXT |
| REASON FOR JOB CHANGE | CORPORATE BANKRUPTCY | There's a lot of that going on in these difficult times. Are you feeling pessimistic? | ced
DIALOGUE CONTROL SYSTEM, METHOD AND COMPUTER READABLE STORAGE MEDIUM, AND MULTIDIMENSIONAL ONTOLOGY PROCESSING SYSTEM, METHOD AND COMPUTER READABLE STORAGE MEDIUM

TECHNICAL FIELD

The present invention relates to a dialogue control system, method and computer readable storage medium, and to a multidimensional ontology processing system, method and computer readable storage medium. The invention is applicable to, for example, an information retrieval and analysis system in which the needs and values of a user are drawn out in a dialogue by iteration of questions that progressively dig deeper and in which information that matches the needs and values of the user is retrieved from a wide variety and large quantity of services and contents.

BACKGROUND ART

It is anticipated that communications via information technology (IT) will broaden from the text information of related art to encompass objects in a range of information media, such as video images and conversations recorded by individuals, broadcast images and cinematic images, product information and sensor information, production records and transport records, geographical and climate information that changes from moment to moment, and so forth, and that usage contexts will dynamically broaden to a range of contexts such as information-providing household appliances, vehicle-mounted terminals, electronic tags, public transport systems, industrial production and distribution sites, store counters, and so forth.

One of the driving factors in this is next-generation information retrieval and analysis technologies which, rather than searching for information with the emphasis only on text in homepages as in current home computers, respond to new communication needs in all contexts—personal life, business and so forth.

In a related art information retrieval and analysis technology, the input of a keyword is received and information that matches the inputted keyword is retrieved from information on a network, and is presented in order of numbers of hits. In addition, there are automatic keyword extension technologies that display keywords that can be used together with the inputted keyword, technologies that recommend products and the like in accordance with data on personal recommendations from large numbers of users, and so forth.

According to these technologies, a user can retrieve many kinds of information containing an inputted keyword. However, this information statistically bundles results of retrievals by large numbers of other users, and is not information that is particular to the actual needs and wants of the user.

In these times of information overload, the number of people who cannot deal with the explosive increase in amounts of information and who struggle to keep track of information selection criteria is currently increasing. For users who have problems of being unable to choose the information, activities and suchlike that they want, an information retrieval and analysis technology in which both simple retrieval and a systematic way of thinking before retrieval are found together is being called for.

Accordingly, the present inventors have proposed information retrieval and analysis technologies (Japanese Patent Application Nos. 2008-036342 and 2008-036356) that employ a laddering technique to draw out the needs and values of a user in a dialogue by iteration of questions that progressively dig deeper, draw out needs relating to services and contents, which are difficult for the user themself to express, by iteration of the dialogue between the user and the system, and retrieve matching information from a wide variety and large quantity of services and contents.

This dialogue-based retrieval system generates question texts on the basis of domain knowledge and presents the questions to the user, analyses answers from the user at the semantic level by intention analysis, and implements retrieval by matching the information drawn out from the user and analysis of previous retrieval targets (for example, results of analysing what needs to be understood from the user's answers) with the results of analysis of retrieval target data.

SUMMARY OF INVENTION

Technical Problem

Now, in a dialogue-based retrieval system, in order to iterate with questions that gradually dig deeper and draw out the actual needs and wants of a user, the following are needed: (1) support for an intention determination process; (2) the promotion of awareness of matters that cannot be put into words by the user themself; and (3) reliable identification of information selection criteria.

That is, in a dialogue-based retrieval system, dynamic personalization for individual users, responses and dialogue flow that seem to fit well with the utterances of a user, the levels of importance of matters that should be asked about in accordance with various changes in circumstances, and the like change from moment to moment. Therefore, it is required that question text presentation, matching and the like be implemented accordingly.

The significance of ontologies has been discussed by Riichiro Mizoguchi et al. in "Foundation of Ontological Engineering: An Ontological Theory of Semantic Links, Classes, Relations and Roles" in Journal of Japanese Society for Artificial Intelligence, Vol. 14, pp. 1019-1032, 1999. The meaning of the term "ontology" herein includes the definition and organization of knowledge about a particular domain, of knowledge covering multiple domains or of general knowledge. The meaning of the term "knowledge" herein indicates words and terms, their meanings, and their relationships with other words and terms, and the meaning of the term "domain" herein refers to fields such as medicine, engineering, real estate, automobiles, finance and so forth.

An ontology can systematically express concepts of words and relationships between words. Therefore, it can be suggested that, in a dialogue-based retrieval system, ontological descriptors for particular domains may be utilized as domain knowledge.

Accordingly, question texts utilizing ontologies may be presented and answers to these question texts may be related. Therefore, an answer (input) from a user may be understood, and modeling of a dialogue up to that point is simple.

However, a current ontology, in representing concepts of words and relationships between words, can only express the concepts of words and the relationships between the words from a single viewpoint. That is, it is not a system that can identify a "gist" or "context" and control a dialogue.

Moreover, while a current ontology may describe the knowledge and information of a particular domain that are required for dialogue and retrieval, because a current ontology can express knowledge relationships from only one viewpoint as mentioned above, the data is static and may not describe the dynamic nature of dialogues and retrievals.

Furthermore, in a dialogue-based retrieval system, it is required that a semantic space that is used be switched instantaneously in accordance with user data and circumstances obtained in a dialogue. However, it has not been possible to implement this.

As a method for dealing with the above, it can be suggested that classes, properties and the like that are dependent on context be expressed using role concepts.

The meaning of the term "role concept" herein includes the idea of representing the role of a semantic relationship between particular concepts. Even if relationships between concepts can be represented, relationships between role concepts may not be described. For example, if there are 100 kinds of role concept, the relationships of all 100 kinds must be separately provided, which may lead to greater intricacy and complexity in data creation and data management.

The present invention provides a dialogue control system, method and computer readable storage medium that may, by employing multidimensional ontologies, smoothe responses and a dialogue flow that seem to fit well with the utterances of a user, and alter levels of importance of matters that should be asked about in accordance with changes in circumstances of the user, and provides a multidimensional ontology processing system, method and computer readable storage medium.

Solution to Problem

A dialogue control system relating to an aspect of the present invention is an ontology processing system that performs predetermined processing using an ontology that systematically expresses domain knowledge representing concepts and relationships between concepts, the ontology processing system including: (1) a dimension-classified ontology storage unit that stores at least one dimension-classified ontology, for each of dimensions for combinations of conditions, the dimension-classified ontologies differing in domain knowledge content; (2) a basic ontology storage unit that stores a basic ontology including domain knowledge content for when there is no condition; (3) a dimension priority storage unit that stores dimension priorities representing priorities of the respective dimensions; (4) a dimension-classified ontology fetcher that, when a condition is specified, fetches from the dimension-classified ontology storage unit one or more dimension-classified ontologies that meet the specified condition; (5) a multidimensional ontology generator that overwrites the content of the fetched dimension-classified ontologies onto the basic ontology, in order according to the dimension priorities of the dimension priority storage unit from the dimension-classified ontology with the lowest dimension priority, and generates a multidimensional ontology to be used with the specified condition; and (6) a processer that performs predetermined processing using the multidimensional ontology generated by the multidimensional ontology generator.

A computer readable storage medium relating to an aspect of the present invention is a computer readable storage medium storing an ontology processing program that performs predetermined processing using an ontology that systematically expresses domain knowledge representing concepts and relationships between concepts, the ontology processing including: (1) storing at least one dimension-classified ontology, for each of dimensions for combinations of conditions, the dimension-classified ontologies differing in domain knowledge content; (2) storing a basic ontology including domain knowledge content for when there is no condition; (3) storing dimension priorities representing priorities of the respective dimensions; (4) when a condition is specified, fetching from the at least one stored dimension-classified ontologies one or more dimension-classified ontologies that meet the specified condition; (5) generating a multidimensional ontology to be used with the specified condition, including overwriting the content of the fetched dimension-classified ontologies onto the basic ontology, in order from the dimension-classified ontology with the lowest stored dimension priority; and (6) performing predetermined processing using the generated multidimensional ontology.

A dialogue control system relating to an aspect of the present invention is a dialogue control system that uses an ontology that systematically expresses domain knowledge representing concepts and relationships between concepts to be used in questions, determines questions for a user and implements the questions, receives user answers to the questions, and controls a dialogue in accordance with the user answers, wherein (1) the domain knowledge includes the concepts and relationships between concepts, and dialogue progress information that specifies movement relationships from concepts employed in questions to concepts to be employed in subsequent questions, and the dialogue control system includes: (2) a dimension-classified ontology storage unit that stores at least one dimension-classified ontology, for each of dimensions for combinations of conditions, the dimension-classified ontologies differing in domain knowledge content; (3) a basic ontology storage unit that stores a basic ontology including domain knowledge content for when there is no condition; (4) a dimension priority storage unit that stores dimension priorities representing priorities of the respective dimensions; (5) a dimension-classified ontology fetcher that, when a concept in the user answers is specified as a condition, fetches from the dimension-classified ontology storage unit one or more dimension-classified ontologies that meet the specified condition; (6) a multidimensional ontology generator that overwrites the content of the fetched dimension-classified ontologies onto the basic ontology, in order according to the dimension priorities of the dimension priority storage unit from the dimension-classified ontology with the lowest dimension priority, and generates a multidimensional ontology to be used with the condition; and (7) a dialogue controller that decides on a concept to be employed in a subsequent question on the basis of the dialogue progress information of the multidimensional ontology generated by the multidimensional ontology generator, and provides the question to the user.

A computer readable storage medium relating to an aspect of the present invention is a computer readable storage medium storing a dialogue control program that uses an ontology that systematically expresses domain knowledge representing concepts and relationships between concepts to be used in questions, determines questions for a user and implements the questions, receives user answers to the questions, and controls a dialogue in accordance with the user answers, wherein (1) the domain knowledge includes the concepts and relationships between concepts, and dialogue progress information that specifies movement relationships from concepts employed in questions to concepts to be employed in subsequent questions, and the dialogue control includes: (2) storing at least one dimension-classified ontology, for each of dimensions for combinations of conditions, the dimension-classified ontologies differing in domain knowledge content; (3) storing a basic ontology including domain knowledge content for when there is no condition; (4) storing dimension priorities representing priorities of the respective dimensions; (5) when a concept is specified as a condition in the user answers, fetching from the at least one stored dimension-classified ontologies one or more dimension-classified ontologies that meet the specified condition; (6) generating a multidimensional ontology to be used with the condition, including overwriting the content of the fetched dimension-classified ontologies onto the basic ontology, in order according to the stored dimension priorities from the dimension-classified ontology with the lowest dimension priority; and (7) deciding on a concept to be employed in a subsequent question on the basis of the dialogue progress information of the generated multidimensional ontology, and providing the question to the user.

An ontology processing method relating to an aspect of the present invention is an ontology processing method that performs predetermined processing using an ontology that systematically expresses domain knowledge representing concepts and relationships between concepts, the ontology processing method including: (1) storing at least one dimension-classified ontology, for each of dimensions for combinations of conditions, the dimension-classified ontologies differing in domain knowledge content; (2) storing a basic ontology including domain knowledge content for when there is no condition; (3) storing dimension priorities representing priorities of the respective dimensions; (4) when a condition is specified, fetching from the at least one stored dimension-classified ontologies one or more dimension-classified ontologies that meet the specified condition; (5) generating a multidimensional ontology to be used with the specified condition, including overwriting the content of the fetched dimension-classified ontologies onto the stored basic ontology, in order according to the stored dimension priorities from the dimension-classified ontology with the lowest dimension priority; and (6) performing predetermined processing using the generated multidimensional ontology.

A dialogue control method relating to an aspect of the present invention is a dialogue control processing method that uses an ontology that systematically expresses domain knowledge representing concepts and relationships between concepts to be used in questions, determines questions for a user and implements the questions, receives user answers to the questions, and controls a dialogue in accordance with the user answers, wherein (1) the domain knowledge includes the concepts and relationships between concepts, and dialogue progress information that specifies movement relationships from concepts employed in questions to concepts to be employed in subsequent questions, and the dialogue control includes: (2) storing at least one dimension-classified ontology, for each of dimensions for combinations of conditions, the dimension-classified ontologies differing in domain knowledge content; (3) storing a basic ontology including domain knowledge content for when there is no condition; (4) storing dimension priorities representing priorities of the respective dimensions; (5) when a concept is specified as a condition in the user answers, fetching from the at least one stored dimension-classified ontologies one or more dimension-classified ontologies that meet the specified condition; (6) generating a multidimensional ontology to be used with the condition, including overwriting the content of the fetched dimension-classified ontologies onto the basic ontology, in order according to the stored dimension priorities from the dimension-classified ontology with the lowest dimension priority; and (7) deciding on a concept to be employed in a subsequent question on the basis of the dialogue progress information of the generated multidimensional ontology, and providing the question to the user.

Advantageous Effects of Invention

According to the present invention, because a multidimensional ontology is employed, responses and a dialogue flow that seem to fit well with the utterances of a user may be smoothed, and the levels of importance of matters that should be asked about in accordance with changes in circumstances of the user may be altered.

BRIEF DESCRIPTION OF DRAWINGS

FIG. 5 is a descriptive diagram describing property definitions (in the form of a table).

FIG. 11 is a descriptive diagram describing a class definition and an option definition of the class "purpose during site visit".

FIG. 14 is a descriptive diagram describing a multidimensional list showing multidimensional priorities.

FIG. 15 is a descriptive diagram describing a dimension priority definition table.

FIG. 17A is a descriptive diagram describing inference definitions that are used during inference processing of the first embodiment.

FIG. 17B is a descriptive diagram describing inference definitions that are used during the inference processing of the first embodiment.

FIG. 17C is a descriptive diagram describing inference definitions that are used during the inference processing of the first embodiment.

FIG. 19A is a descriptive diagram describing user data that is acquired by the domain knowledge manager (second).

FIG. 25 is a descriptive diagram describing property definitions in respective dimensions.

FIG. 26 is a descriptive diagram describing a frequent expression subroutine definition of the first embodiment.

FIG. 27 is a descriptive diagram describing a structure of user data when a frequent expression is detected.

FIG. 28A is a descriptive diagram describing a class definition and a check text definition of the class "state=uncertain".

FIG. 28B is a descriptive diagram describing a class definition and a check text definition of the class "state=uncertain".

Figure 1:
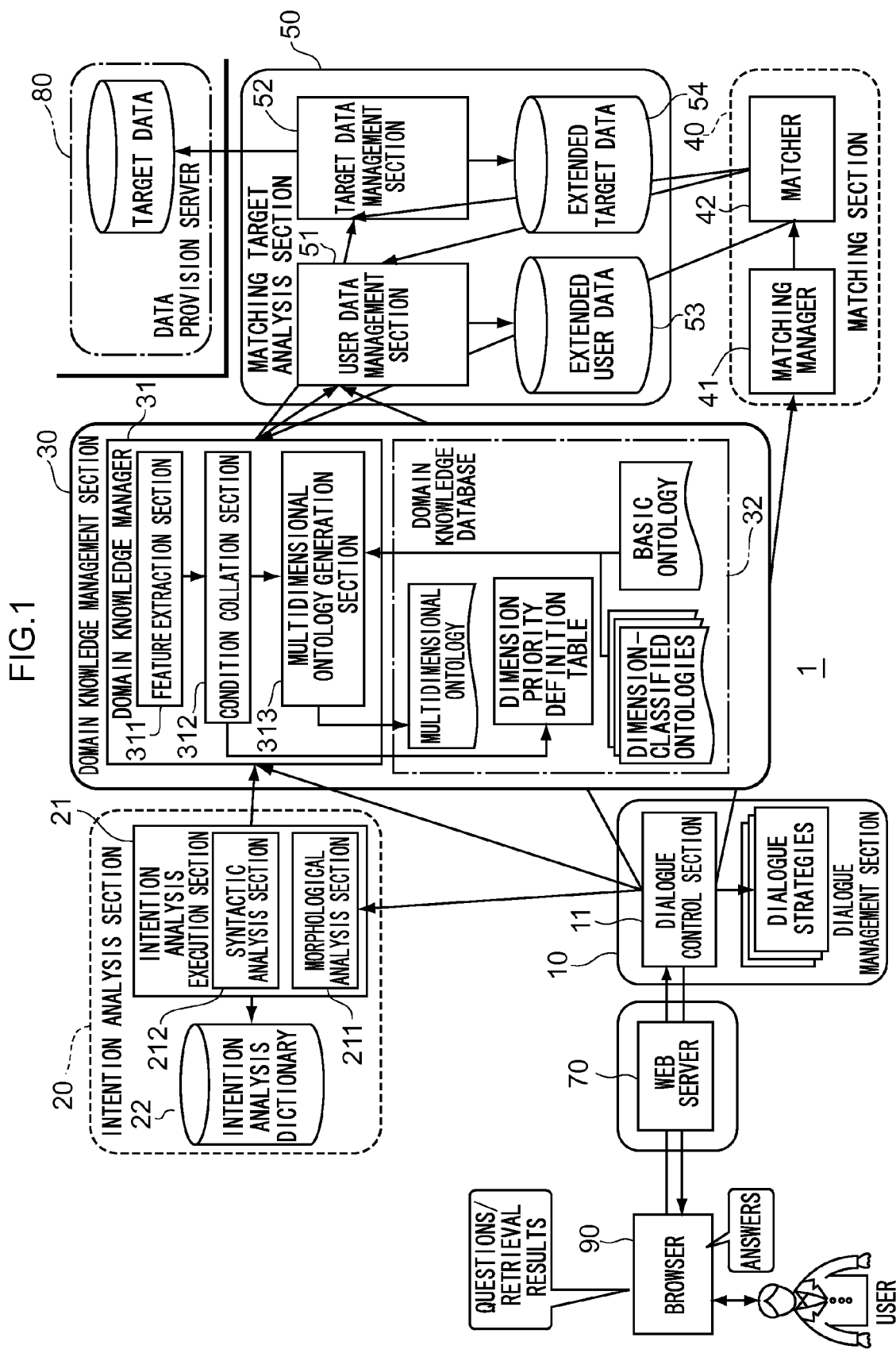
FIG. 1 is an overall schematic diagram illustrating overall structure of a dialogue-based analysis and retrieval system of a first embodiment.

DETAILED DESCRIPTION OF THE INVENTION (A) First Embodiment

Herebelow, a first embodiment of the dialogue control system, method and computer readable storage medium and the multidimensional ontology processing system, method and computer readable storage medium of the present invention is described in detail while referring to the attached drawings.

In the first embodiment, an example of an embodiment that applies the present invention to a dialogue-based analysis and retrieval system that uses laddering to draw out the needs and wants of a user in a dialogue by iteration of questions to the user is described.

(A-1) Basic concept of multidimensional ontology

Firstly, the concept of a multidimensional ontology that is used in the first embodiment is described while referring to the drawings.

The meaning of the term "multidimensional ontology" herein is intended to include an ontology in which plural semantic spaces are converted to multiple dimensions and maintained and a semantic space that is used may be instantaneously switched in accordance with user data or target data/circumstances obtained in a dialogue.

As mentioned above, a current ontology only expresses concepts of words and relationships between words from a single viewpoint. Therefore, if a current ontology is used in a dialogue-based retrieval system, only static data is obtained.

Accordingly, in the first embodiment, a system is proposed that may convert an ontology to multiple dimensions and maintain the same, and that may automatically move between dimensions whenever the information drawn out from a user changes.

Thus, semantic spaces may be switched between and information for a dialogue may be switched, instantaneously in accordance with user data, circumstances and the like obtained from the dialogue. Therefore, the dynamic nature of dialogues and retrievals may be realized in the form of a system. Moreover, data may be inherited between dimensions. As a result, descriptiveness and efficiency thereof (minimal descriptions) are realized at the same time. Thus, detailed descriptions may be implemented only where descriptions that are most particular to multidimensional formation should be implemented.

Figure 2:
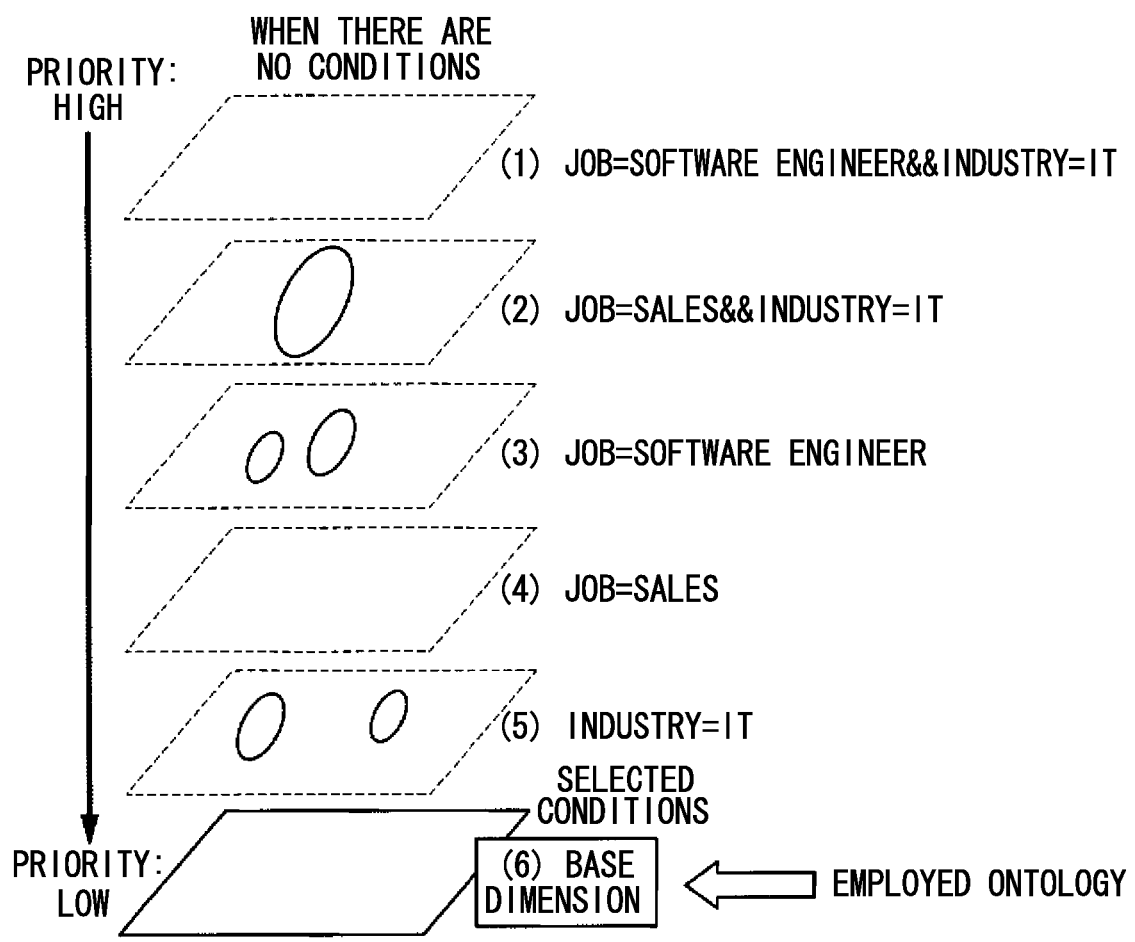
FIG. 2 is a descriptive diagram describing the basic concept of a multidimensional ontology (first).
Figure 3:
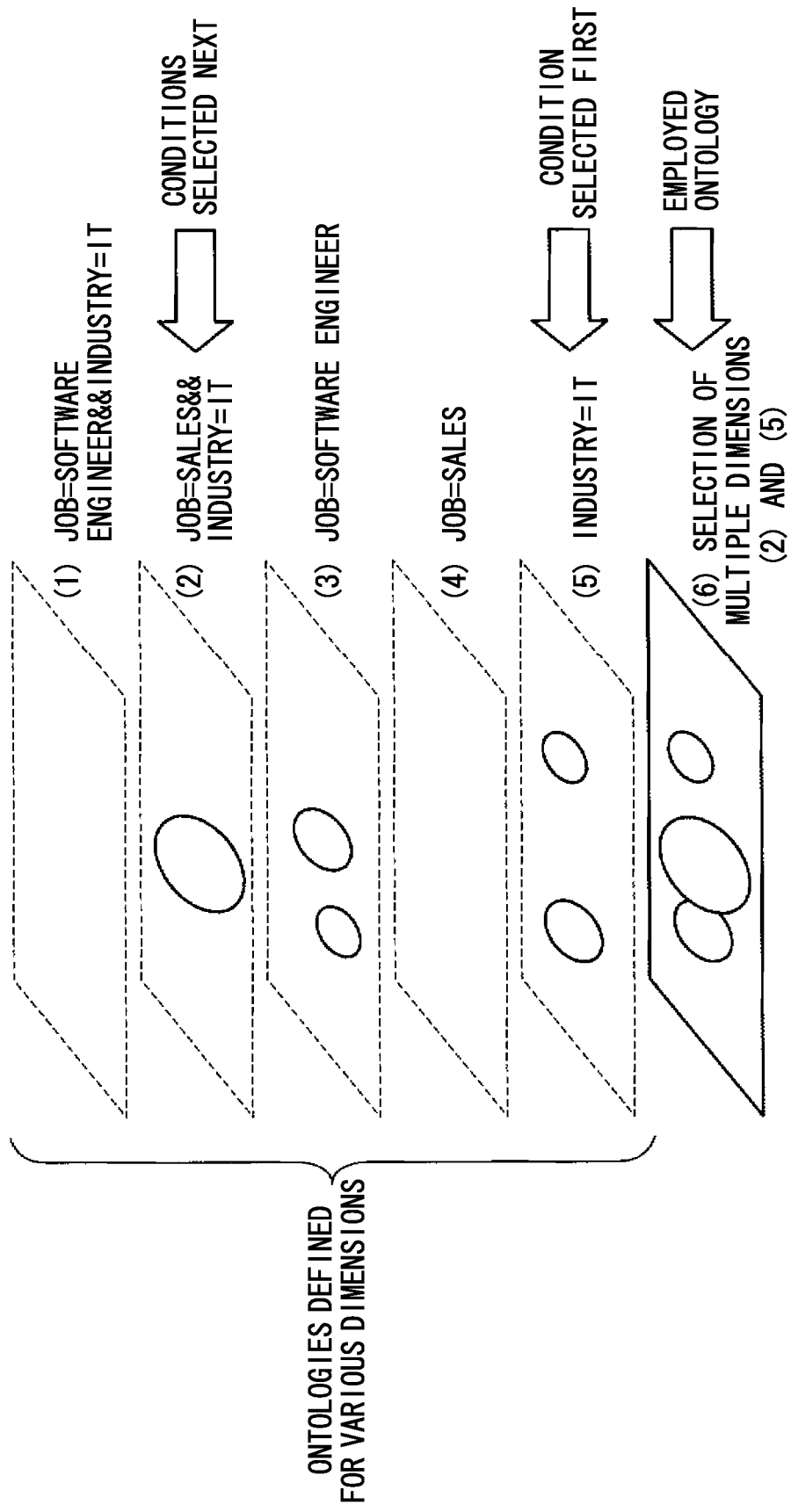
FIG. 3 is a descriptive diagram describing the basic concept of a multidimensional ontology (second).

FIG. 2 and FIG. 3 are descriptive diagrams describing the basic concept of a multidimensional ontology. FIG. 2 and FIG. 3 show an example in which a dialogue-based retrieval and analysis system 1 of the first embodiment is used in a job posting system.

As illustrated in FIG. 2 and FIG. 3, in the multidimensional ontology, dimensions in which respective properties are specified are related in accordance with priority levels.

In a base dimension and sub dimensions, respectively different ontologies are defined. The meaning of the term "base dimension" herein includes a dimension whose priority is lowest and in which all classes and properties that are defined in the sub dimensions are defined. In the sub dimensions, only the classes and properties that are respectively required are defined. Accordingly, the greater a number of conditions, the higher the priority. Where numbers of conditions are the same, priorities may be set in advance by development staff.

For example, in FIG. 2 and FIG. 3, an example is shown of an ontology with six dimensions, including the base dimension. The sub dimension "industry=IT", the sub dimension "job=sales" and the sub dimension "job=software engineer" each have one condition, so the numbers of conditions are the same. However, the priorities are set to increase in the order: the sub dimension "industry=IT", the sub dimension "job=sales", the sub dimension "job=software engineer".

The sub dimension "job=sales&&industry=IT" (this symbolism represents "the job is sales and the industry is IT"), and the sub dimension "job=software engineer&&industry=IT" both have two conditions. However, the priorities are set to increase in the order: the sub dimension "job=sales&&industry=IT", the sub dimension "job=software engineer&&industry=IT".

Thus, if these dimensions are overlaid, because the base dimension has the lowest priority, the priorities of the dimensions increase in the order: "base dimension" the sub dimension "industry=IT" the sub dimension "job=sales" the sub dimension "job=software engineer" the sub dimension "job=sales&&industry=IT" the sub dimension "job=software engineer&&industry=IT".

In FIG. 2 and FIG. 3, the ellipses in the respective sub dimensions represent classes and properties that are defined in those sub dimensions.

FIG. 2 is illustrated for a user for "when nothing (no data) has been acquired". In this case, the dialogue has not started to progress. Hence, the dialogue progresses using the classes and properties defined in the base dimension (not illustrated in FIG. 2).

The dialogue progresses, and a condition of the user "industry=IT" is acquired. Then, as illustrated in FIG. 3, the sub dimension that is employed becomes the sub dimension "industry=IT", and the dialogue switches to using the classes and properties defined in the sub dimension "industry=IT".

The dialogue progresses further, and conditions of the user "job=sales" and "industry=IT" are acquired. Then, as illustrated in FIG. 3, the dimension that is applied becomes the sub dimension "job=sales&&industry=IT", and the dialogue switches to using the classes and properties that are defined in the sub dimension "job=sales&&industry=IT".

Here, the dimensions employed in the dialogue are the two sub dimensions "industry=IT" and "job=sales&&industry=IT", and the classes and properties of the employed sub dimensions are overwritten to and inherited by the base dimension. The classes and properties are inherited in order from the sub dimension with the lowest priority, such that the classes and properties of the sub dimension with the highest priority are memorized. That is, the classes and properties of the sub dimension "industry=IT" are memorized in the base dimension, after which they are overwritten by the classes and properties of the sub dimension "job=sales&&industry=IT".

Thus, the data is inherited in multiple dimensions by using this kind of multidimensional ontology.

(A-2) Structure of the First Embodiment

Herebelow, overall structure of the dialogue-based analysis and retrieval system of the first embodiment is described while referring to FIG. 1.

In FIG. 1, the dialogue-based retrieval and analysis system 1 of the first embodiment includes at least a dialogue management section 10, an intention analysis section 20, a domain knowledge management section 30, a matching section 40 and a matching target analysis section 50.

The dialogue-based retrieval and analysis system 1 is connected with a data provision server 80 that provides data to users. The dialogue-based retrieval and analysis system 1 acquires target data that is retained by the data provision server 80, and stores the target data in extended target data 54 of the matching target analysis section 50.

When a user uses a browser 90 to access a web server 70, the dialogue-based retrieval and analysis system 1 is launched. As a user side interface, interfaces that are widely employed in personal computers with communication functions, and in portable terminals, specialist terminals and the like may be employed. However, a voice synthesis and recognition section that converts what the user says to text or the like may also be provided.

The dialogue management section 10 manages the progress of the dialogue with the user wanting the retrieval. The dialogue management section 10 includes a dialogue control section 11 that controls progress of the dialogue.

The dialogue control section 11 receives a multidimensional ontology from the domain knowledge management section 30 and, on the basis of this multidimensional ontology, creates a question text (also referred to as a system utterance text) in relation to the progress of the dialogue.

The dialogue control section 11 provides an answer text (also referred to as a user utterance text) from the user in response to the question text to the intention analysis section 20 and causes the intention analysis section 20 to analyse the content of the user utterance text. When the dialogue control section 11 receives an intention analysis result of the user utterance text, the dialogue control section 11 stores the intention analysis result of this user utterance text in extended user data 53 of the matching target analysis section 50, to serve as user data.

In addition, when the dialogue control section 11 receives the intention analysis result from the intention analysis section 20, the dialogue control section 11 provides the intention analysis result to the domain knowledge management section 30, causes the domain knowledge management section 30 to generate a multidimensional ontology to be used in the progress of the dialogue, and uses the multidimensional ontology from the domain knowledge management section 30 to determine the next question text and progress with the dialogue.

The dialogue control section 11 instructs the matching section 40 to perform matching between the user data and target data. The timing at which this matching is instructed may be set to various timings such as, for example, when a matching instruction is received from a user, each time an answer text to a question text is provided, when all question items are completed, or the like.

The intention analysis section 20 receives a user utterance text with which the user has answered a question text received from the dialogue control section 11, and analyses the content of the user utterance text. The intention analysis section 20 converts the analysed intention analysis result to an ontology format and provides the same to the dialogue control section 11. The intention analysis section 20 includes an intention analysis execution section 21 and an intention analysis dictionary 22.

The intention analysis execution section 21 includes a morphological analysis section 211 that refers to the intention analysis dictionary 22 and analyses morphemes of the user utterance text, and a syntactic analysis section 212 that refers to the intention analysis dictionary 22 and analyses syntax of the user utterance text.

The intention analysis execution section 21 performs morphological analysis and syntactic analysis of the user utterance text, and thus acquires a class defined in the property definitions of a domain knowledge database 32 and provides the acquired class to the domain knowledge management section 30.

The intention analysis dictionary 22 is a collection of dictionaries for analysing content of user utterance texts and corresponds to, for example, a morphology dictionary (for example a Japanese morphology dictionary), a syntax dictionary (for example, a Japanese syntax dictionary) and a domain knowledge dictionary that is automatically generated from the base dimension and the class definitions of the respective dimensions, or the like.

The domain knowledge management section 30 manages domain knowledge for which multidimensional ontologies of respective domains serve as knowledge. The domain knowledge management section 30 includes a domain knowledge manager 31 and the domain knowledge database 32.

The domain knowledge database 32 stores property definitions, class definitions and inference definitions of the base dimension and the respective dimensions for constructing a multidimensional ontology, dimension conditions for structuring the multidimensional ontology, a dimension priority definition table that defines priorities of the dimension conditions, and the generated multidimensional ontology.

The domain knowledge manager 31 receives the intention analysis result from the dialogue control section 11, extracts features from the intention analysis result, and generates the multidimensional ontology while referring to the property definitions and dimension priority definition table in the domain knowledge database 32. The domain knowledge manager 31 stores the generated multidimensional ontology in the domain knowledge database 32.

The domain knowledge manager 31 of the domain knowledge management section 30 includes a feature extraction section 311, a condition collation section 312 and a multidimensional ontology generation section 313.

The feature extraction section 311 checks whether or not a feature that is a dimension condition (a value matching a dimension condition) is set in the intention analysis result analysing the content of the user utterance text, and if such is set, extracts this feature.

The condition collation section 312 collates the dimension value extracted by the feature extraction section 311 with the content of the dimension priority definition table.

The multidimensional ontology generation section 313 overlays dimension-classified ontologies with a basic ontology in accordance with the priorities in the dimension priority definition table and generates a multidimensional ontology.

The matching section 40 performs matching between user data stored in a user data management section 51 and the target data stored in the matching target analysis section 50, and matches up conditions desired by the user.

The matching section 40 includes a matching manager 41 and a matcher 42. The matching manager 41 provides the multidimensional ontology received from the dialogue control section 11 to the matcher 42 and provides information matched by the matcher 42 to the dialogue control section 11. The matcher 42 performs matching processing between the user data and the target data.

The matching target analysis section 50 stores the user data and target data that are the targets of matching. The matching target analysis section 50 extends the data to a form that is easy for matching, and stores the extended user data and target data. The matching target analysis section 50 includes the user data management section 51, a target data management section 52, the extended user data 53 and the extended target data 54.

The user data management section 51 stores user information obtained from user utterances by the dialogue control section 11 in the user data database (extended user data) 53. This user data database (extended user data) 53 holds user data paths representing storage locations (storage positions) of user information and user data class names representing values of the user information.

(A-3) Operation of the First Embodiment

Next, operation of the dialogue control system of the dialogue-based retrieval and analysis system 1 of the first embodiment is described while referring to the drawings.

(A-3-1) Overall Operation

Firstly, the overall flow of dialogue control in the dialogue-based retrieval and analysis system 1 is described while referring to the drawings.

Figure 4:
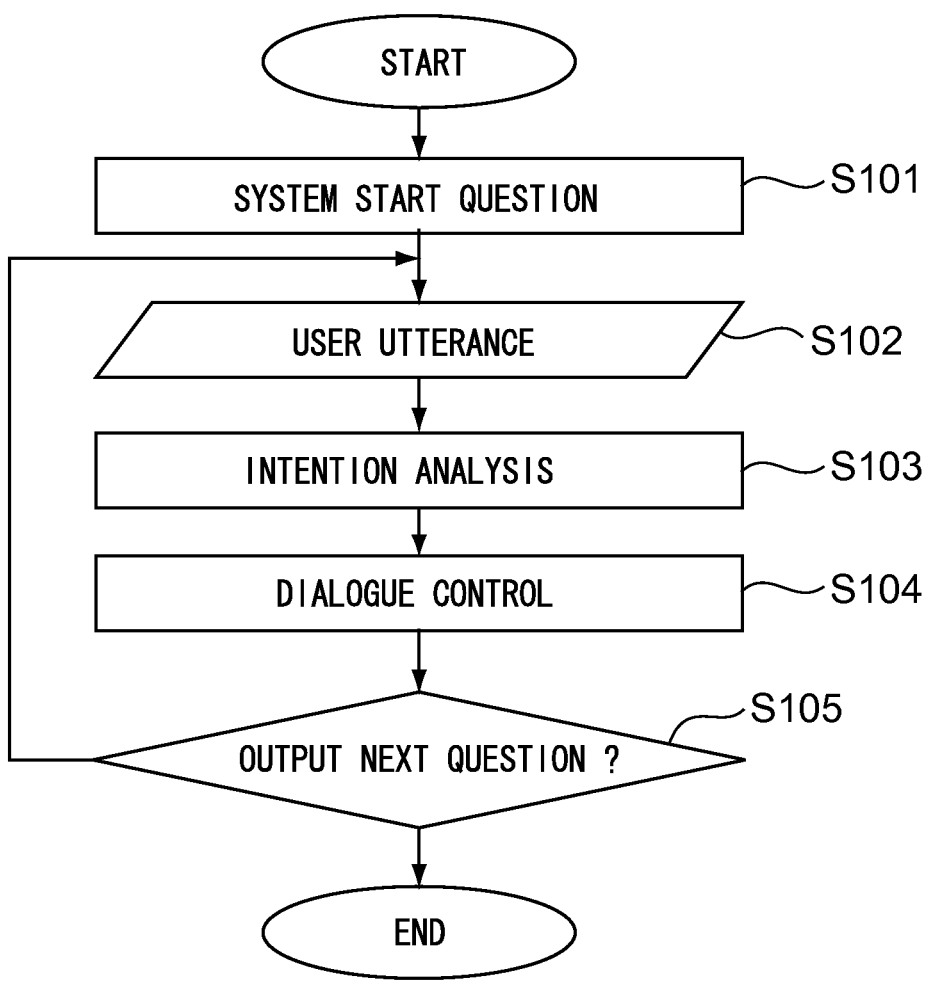
FIG. 4 is a flowchart illustrating overall flow of a dialogue control system of the first embodiment.

FIG. 4 is a flowchart illustrating the overall flow of dialogue control of the dialogue-based retrieval and analysis system 1.

A user using the dialogue-based retrieval and analysis system 1 uses the browser 90 to access a designated URL, and launches the dialogue-based retrieval and analysis system 1 via the web server 70.

When the dialogue-based retrieval and analysis system 1 launches, the dialogue control section 11 refers to the property definitions stored in the domain knowledge database 32, via the domain knowledge manager 31, and selects a property with the highest priority among properties contained in a current definition range of a pointer.

Figure 6:
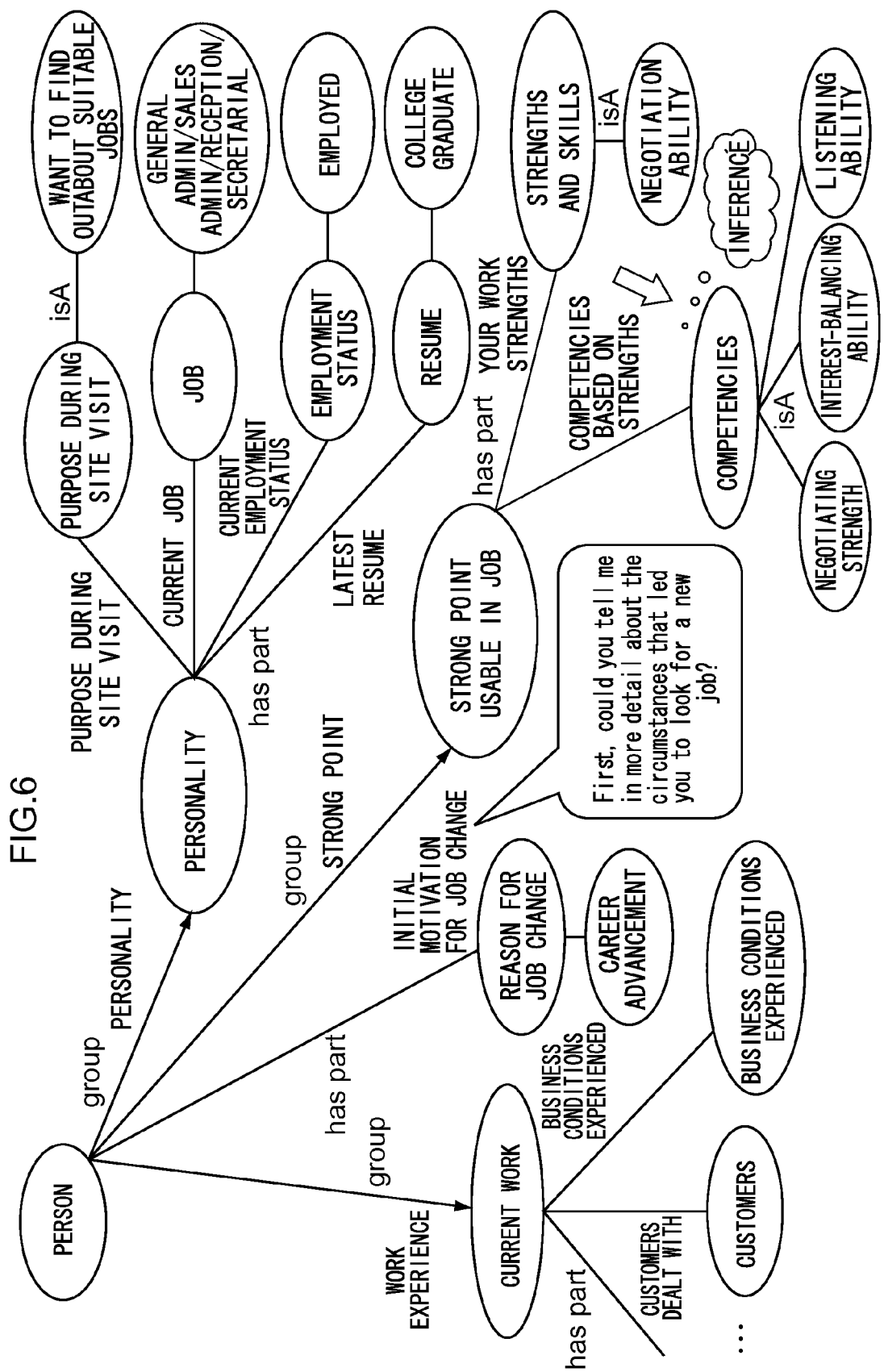
FIG. 6 is a descriptive diagram describing the property definitions (in the form of a network).

FIG. 5 is a structural diagram illustrating a structure of property definitions, and FIG. 6 is a diagram showing some of the property definitions in the form of a network.

The property definitions illustrated in FIG. 5 are an example of property definitions of the base of the multiple dimensions, and describe property relationships of respective classes, with, for example, "person" at the top. Option information relating to system utterances, a dialogue strategy and the like contained in the properties is described, and defines what kind of questions the system asks and in what order.

In FIG. 5, the property definitions include fields for a definition range, a property, a value range and option information. The option information is provided with an importance representing a level at which questions are necessary and a priority representing a level with which a sequence of questions is determined (that is, the flow of the dialogue).

Basic question texts that are generated by the dialogue-based retrieval and analysis system 1 are defined in the option information. In FIG. 5, various functions for the system to progress smoothly with a dialogue are defined in the option information, such as link texts that are generated before question texts, check texts of various kinds that are generated on the basis of intention analysis results, and the like.

The kinds of example texts described in the option information are, for example, start texts, emotion check texts, property check texts, ontology check texts, inference check texts, inference rule check texts, frequent expression check texts, user data check texts, selection check texts, descriptive texts, link texts, question texts, end texts and the like. For example, ontology check texts may be seen in FIG. 16, in which the value "Have you been working in sales?" is set for the class "sales".

Kinds of property are described in the option information. For example, there are groups and acquisition targets in the option information. Here, a case with two kinds of property is illustrated, but this is not a limitation and other kinds of property may be specified.

When the kind of property is "acquisition target", the domain knowledge manager 31 provides the basic question text specified in the basic question text field to the dialogue control section 11, and the dialogue control section 11 sends the same through the web server 70 to the user side to be a system utterance text.

On the other hand, when the kind of property is "group", the domain knowledge manager 31 retrieves and selects a property for which that value range class is in the definition range. At this time, if there are a plural number of properties with that value range class in the definition range, the domain knowledge manager 31 looks at the priorities in the option information and selects the property with the highest priority. Then, if the selected property is an "acquisition target", the domain knowledge manager 31 provides the basic question text thereof to the dialogue control section 11, and the dialogue control section 11 sends the same to the user side to be a system utterance text.

Thus, when the kind of property is a group, a shift to a property with that value range class in its definition range may be implemented.

FIG. 6 is a structural diagram in which some of the property definitions illustrated in FIG. 5 are expanded in the form of a network.

In FIG. 6, the ellipses represent classes (that is, the definition ranges and value ranges of FIG. 5), and the lines joining the classes represent properties.

For example, in FIG. 6, "person" is at the top, when the property is "personality" the value range is "personality", when the property is "strong point" the value range is "strong point usable in job", when the property is "initial motivation for job change" the value range is "reason for job change", and when the property is "work experience" the value range is "current work".

Then if, for example, "personality" is the definition range, as described above, relationships are that the value range when the property is "purpose during site visit" is "purpose during site visit" and so forth. "Personality" has the relationship "has part" with "purpose during site visit" and the like, while "purpose during site visit" has the relationship "is a" with "want to find out about suitable jobs", which is a user answer.

When the system starts up, a definition range selected as an initial value in the property definitions is specified. A pointer is set to the first definition range class in FIG. 5, "person".

Then, if "personality" is the property with the highest priority in the definition range class "person" initially indicated by the pointer, the domain knowledge manager 31 looks at the value range class "personality".

Here, the kind of property of the value range class "personality" is "group". Accordingly, from among properties for which the value range class "personality" is in the definition range, the domain knowledge manager 31 selects the property with the highest priority: with the definition range class "personality"—the property "purpose during site visit"—the value range class "purpose during site visit".

Then, the domain knowledge manager 31 provides the basic question text for this property, "What is your purpose in visiting this site?", to the dialogue control section 11, and the dialogue control section 11 sends this basic question text to the user side to be a system utterance. Thus, questions from the system are started (step S101).

The user receiving this system utterance text responds with, for example, "I want to learn something about jobs that would be suitable for me.", and this is sent through the web server 70 to the dialogue control section 11 as an answer text (step S102).

When the dialogue control section 11 receives a user utterance text, the dialogue control section 11 provides the user utterance text to the intention analysis section 20. At the intention analysis section 20, the intention analysis execution section 21 uses the intention analysis dictionary 22 to perform morphological analysis and syntactic analysis of the user utterance text, analyses a user intention that is the result of the analysis, "wants to know about suitable jobs", and provides this intention analysis result to the dialogue control section 11 (step S103).

Then, the intention analysis result at the intention analysis section 20 is provided to the domain knowledge manager 31, a multidimensional ontology is generated by the domain knowledge manager 31, and the generated multidimensional ontology is memorized in the domain knowledge database 32.

When the dialogue control section 11 receives the intention analysis result from the intention analysis section 20, the dialogue control section 11 makes an enquiry to the domain knowledge manager 31 about a next question and decides the next question (step S104).

At this time, the domain knowledge manager 31 refers to the property definitions, switches to the next highest priority in the value range class "purpose during site visit": with the definition range class "personality"—the property "current job"—the value range class "job", and provides the basic question text, "What is your current job?" to the dialogue control section 11. The dialogue control section 11 determines that this is a system utterance text and sends it to the user side (step S105).

Thus, by iterating the presentation of subsequent question texts and the reception of answer texts from the user, a dialogue between the system and the user is implemented.

When no next question is determined in step S104, which is to say when all questions have been completed, operation of the system ends.

(A-3-2) Intention analysis processing

Next, detailed operation of the intention analysis processing in step S104 of FIG. 4 is described while referring to the drawings.

Figures 7, 8:
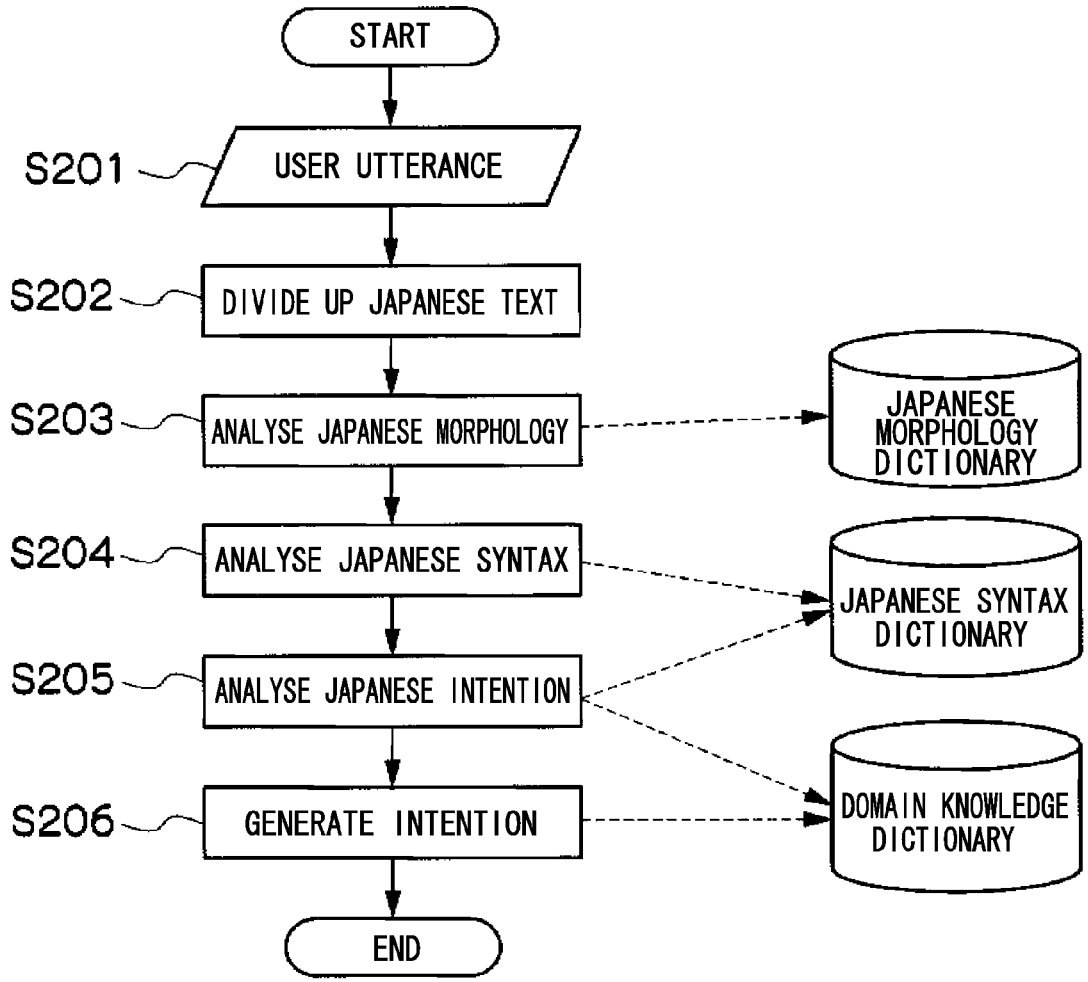
FIG. 7 is a flowchart illustrating intention analysis processing of the first embodiment.
FIG. 8 is a descriptive diagram describing a class definition and an alternative expression definition of the class "purpose during site visit".

FIG. 7 is a flowchart illustrating detailed operation of the intention analysis processing.

The dialogue control section 11 receiving a user utterance text provides the user utterance text to the intention analysis section 20 (step S201). The intention analysis execution section 21 performs intention analysis of this user utterance text.

For example, a user answer text relating to the value range class "purpose during site visit" is "I want to learn something about jobs that would be suitable for me."

First, at the intention analysis execution section 21, the user utterance text is divided into text units to divide up the Japanese text (step S202). The morphological analysis section 211 uses the Japanese morphology dictionary at the intention analysis dictionary 22 to perform a morphological analysis of the user utterance text (step S203).

Then, while referring to the Japanese syntax dictionary at the intention analysis dictionary 22, the syntactic analysis section 212 performs a syntactic analysis using the result of the morphological analysis (step S203).

The intention analysis execution section 21 uses the Japanese syntax dictionary and the domain knowledge dictionary at the intention analysis dictionary 22 to perform an intention analysis from the results of the syntactic analysis by the syntactic analysis section 212 (step S205).

Information relating to classes and alternative expressions (meaning definitions of other notations) is automatically generated beforehand from, for example, the class definition and alternative expression definition illustrated in FIG. 8, and stored beforehand in the domain knowledge dictionary.

FIG. 8 illustrates a structural example of a class definition and an alternative expression definition stored in the domain knowledge dictionary. FIG. 8 represents a format in which the class and the alternative expression are provided with a correspondence relationship.

As illustrated in FIG. 8, as an example, in the domain knowledge dictionary, the class "wants to find out about suitable jobs" is defined as a class under the property "purpose during site visit"—the value range class "purpose during site visit". The alternative expressions of this class are defined as "suitable jobs+find out|jobs that suit me+find out" (the meaning of the symbol | is "or").

The syntactic analysis section 212 refers to the domain knowledge dictionary and acquires syntax analysis results of the class for the value range class "purpose during site visit". For example, if the class definition in the domain knowledge dictionary is "wants to know about suitable job", the syntactic analysis section 212 acquires the class "wants to know about suitable job".

Figure 9:
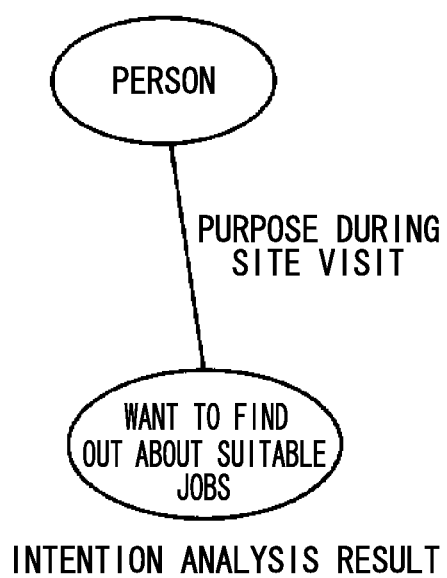
FIG. 9 is a descriptive diagram describing an intention analysis result analysed by an intention analysis unit.

The syntactic analysis section 212 provides the property "purpose during site visit"—the class "wants to know about suitable jobs" to the dialogue control section 11 in an ontology format as illustrated in FIG. 9 (step S206), and the processing ends.

(A-3-3) Dialogue control processing

Next, detailed operation of the dialogue control processing in step S105 of FIG. 4 is described while referring to the drawings.

Figure 10:
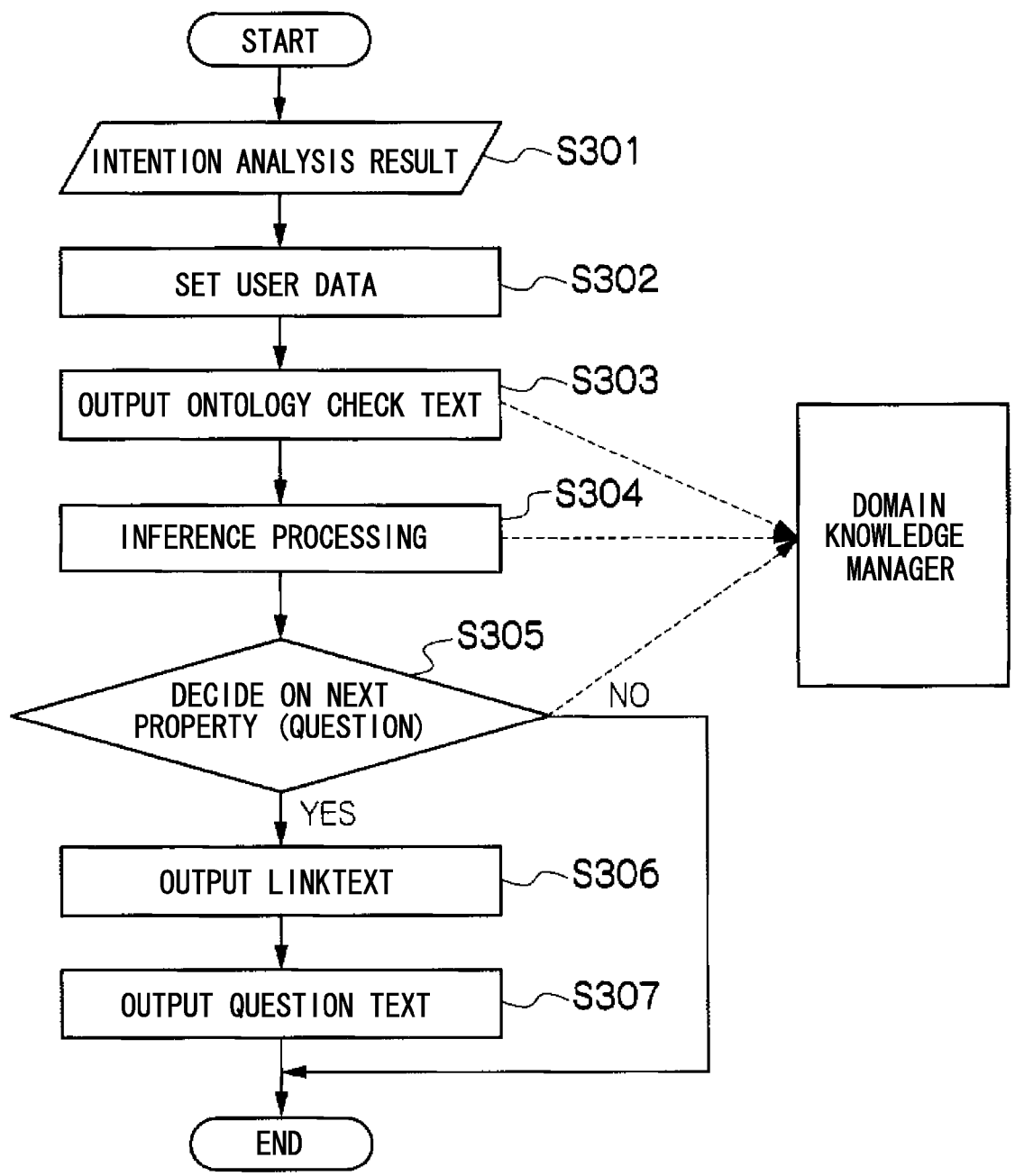
FIG. 10 is a flowchart illustrating dialogue control processing of the first embodiment.

FIG. 10 is a flowchart illustrating detailed operation of the dialogue control processing.

An intention analysis result from the intention analysis section 20 is provided to the dialogue control section 11 (step S301).

For example, if an intention analysis result is in an ontology format and is, for example, the property "purpose during site visit"—the class "wants to find out about suitable jobs", an intention analysis result that "/person/purpose during site visit=wants to know about suitable jobs" is provided.

The dialogue control section 11 stores this intention analysis result in the extended user data 53 of the user data management section 51 (step S302).

The dialogue control section 11 also provides the intention analysis result to the domain knowledge manager 31. The domain knowledge manager 31 acquires the class definition of the class "wants to find out about suitable jobs" that has been stored in the domain knowledge database 32.

Then, the domain knowledge manager 31 judges whether or not an ontology check text (hereinafter referred to simply as a check text) is described as option information in this class definition. If such is described, the domain knowledge manager 31 provides this check text to the dialogue control section 11, and the dialogue control section 11 sends the check text to the user side (step S303).

Here, the check text is a text for implementing some kind of check relating to an answer from the user. In a related art dialogue-based retrieval system, whether or not content uttered by a user can be correctly understood may be uncertain. In contrast, in the present embodiment, in order to provide the user with a sense of reliability, check texts corresponding to the classes are defined as option information in the class definitions.

FIG. 11 is a structural diagram illustrating the structure of a class definition with a defined option. FIG. 11 illustrates a class definition for the property "purpose during site visit"—the class "wants to find out about suitable jobs". In FIG. 11, "Would you like to re-confirm your details?" is defined as a check text for the property "purpose during site visit"—the class "wants to find out about suitable jobs".

The domain knowledge manager 31 acquires the class definition illustrated in FIG. 11. Accordingly, because a check text is defined in the option information of the class definition, the domain knowledge manager 31 provides the check text "Would you like to re-confirm your details?" to the dialogue control section 11. The dialogue control section 11 outputs the check text to the user as a system utterance text.

Furthermore, if there is inference data relating to the intention analysis result "/person/purpose during site visit=wants to know about suitable jobs", the dialogue control section 11 performs inference processing with this inference data (step S304). Details of this inference processing are described below.

Then, the dialogue control section 11 provides the fact that the pointer is currently at the definition class "personality"—the value range class "purpose during site visit" to the domain knowledge manager 31. From among the properties of the definition range class "personality" currently indicated by the pointer, the domain knowledge manager 31 then selects the property with the highest priority, "current job", as a question target (step S305).

At this time, if a link text is described as option information of the property "current job", the domain knowledge manager 31 provides this link text to the dialogue control section 11. Then the dialogue control section 11 outputs the link text to the user (step S306). In this case, no link text is described for the property "current job", so no link text is outputted.

Then, after the output of the link text, the dialogue control section 11 outputs the basic question text for the property with the highest priority, "current job", to the user (step S307).

As described above, system utterance texts are uttered in the order "check text" "link text" "basic question text". Plural numbers of check texts and link texts with different kinds of content may be uttered. Because the system causes utterances in this order, what the system has understood may be shown to the user. Thus, the user is provided with a sense of reliability, and the dialogue may be caused to progress while providing the user with a sense of fitting well.

(A-3-4) Ontology check text output processing

Next, processing of the domain knowledge manager 31 using the multidimensional ontology is described.

Firstly, details of check text output processing in step S303 of FIG. 10, in which the domain knowledge manager 31 outputs the check text to the dialogue control section 11, is described in detail while referring to the drawings.

Figure 12:
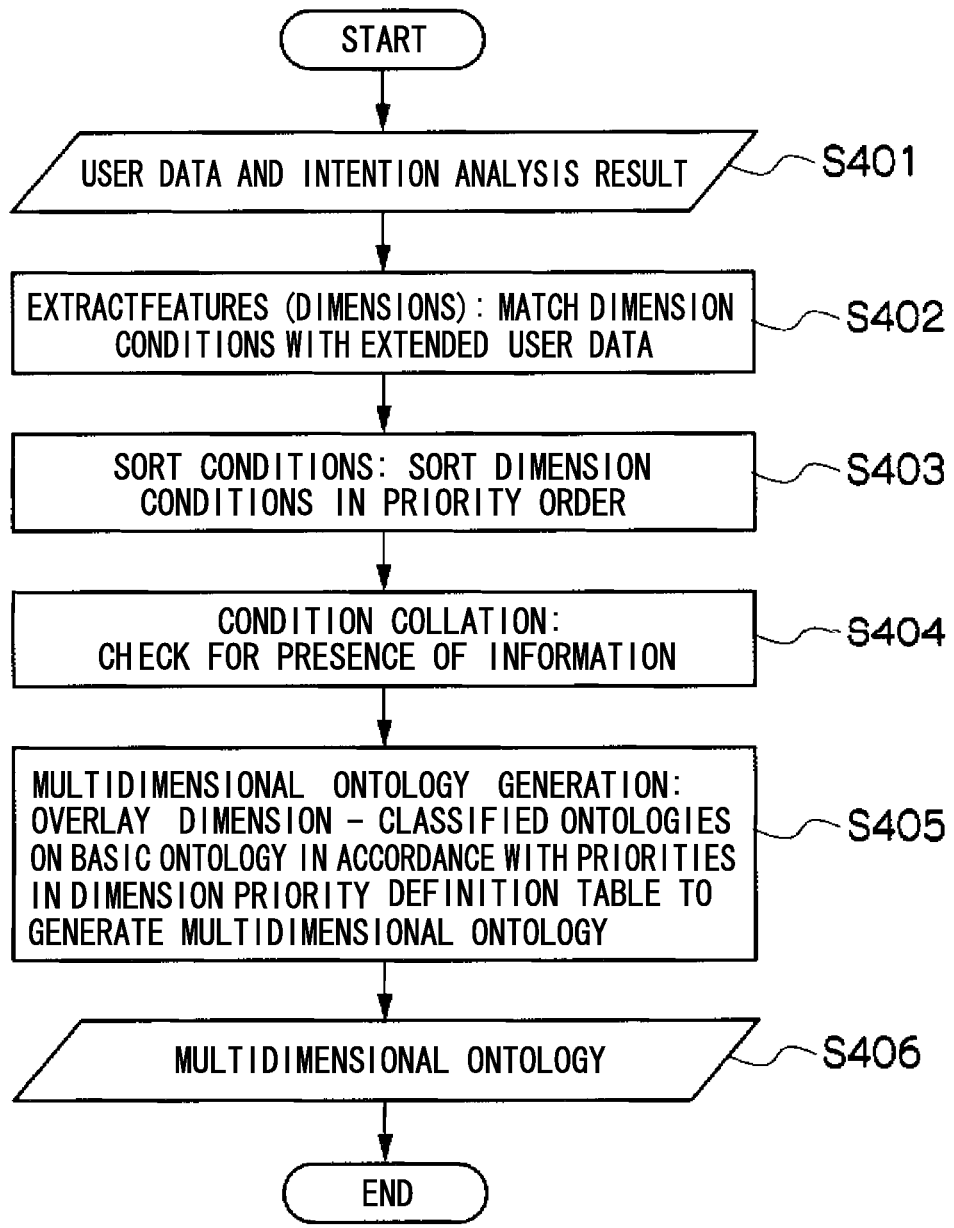
FIG. 12 is a flowchart illustrating domain knowledge manager processing of the first embodiment.

FIG. 12 is a flowchart illustrating operation of the check text output processing at the domain knowledge manager 31.

The domain knowledge manager 31 receives an intention analysis result from the dialogue control section 11. The domain knowledge manager 31 also acquires user data of the user from the user data management section 51 (step S401).

As an example, the intention analysis result from the dialogue control section 11 is "/person/personality/current job=sales".

Figure 13:
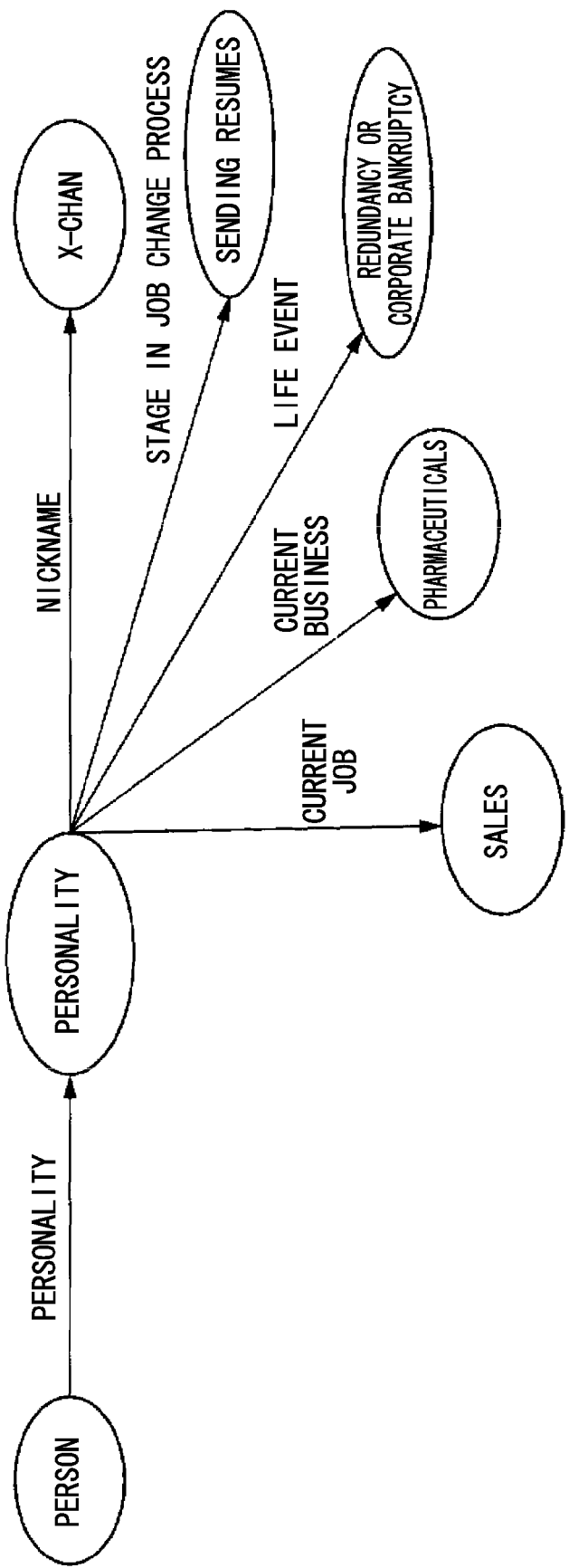
FIG. 13 is a descriptive diagram describing user data acquired by a domain knowledge manager.

The user data of the user from the user data management section 51 has the content illustrated in FIG. 13. As illustrated in FIG. 13, the user data is described in an ontology format. In the case of FIG. 13, the user data of the user is that the class of the property "nickname" is the class "X-chan" and, similarly, there are the property "stage in job change process"—the class "sending resumes", the property "life event"—the class "redundancy or corporate bankruptcy", the property "current business"—the class "pharmaceuticals", and the property "current job"—the class "sales".

Herein, for convenience of description, a case is illustrated in which the classes corresponding to the properties obtained from user answers serve as the data. However, content in which the user data is extended is possible, such as data that is a new class inferred from the classes of answers from the user, and the like.

The feature extraction section 311 of the domain knowledge manager 31 collates the user data against all the dimension conditions registered in the domain knowledge database 32, and extracts dimension conditions that fit the conditions (step S402). That is, the feature extraction section 311 checks whether or not any of the values that are dimension conditions are included in the user data, and if there are values that are conditions, extracts the values that are conditions of the dimensions thereof.

For example, as the conditions of dimensions that are stored in the domain knowledge database 32, there are "/person/personality/current job=sales", "/person/personality/current industry=pharmaceuticals" and "/person/personality/life event=redundancy or corporate bankruptcy&&/person/personality/current job=sales".

The feature extraction section 311 matches the dimension conditions as described above, and extracts the features "/person/personality/current job=sales", "/person/personality/current industry=pharmaceuticals" and "/person/personality/life event=redundancy or corporate bankruptcy&&/person/personality/current job=sales" from the user data.

Next, the condition collation section 312 sorts the values that are dimension conditions extracted by the condition collation section 312 in order of the predetermined priorities increasing (step S403), checks whether the values that are dimension conditions are present or absent, and stores the values in a dimension priority definition table (step S404).

For example, the priority is higher where the number of conditions of a dimension is larger. If there are dimensions with the same numbers of conditions, the priorities of the respective dimensions are specified beforehand, and the sorting is performed in accordance with these priorities.

For example, of the values of the dimension conditions extracted by the feature extraction section 311, the number of conditions of "/person/personality/life event=redundancy or corporate bankruptcy&&/person/personality/current job=sales" is two, so the priority is highest.

Next, the numbers of dimension conditions of "/person/personality/current job=sales" and "/person/personality/current industry=pharmaceuticals", are one, and are the same.

Accordingly, the condition collation section 312 refers to, for example, the dimension list illustrated in FIG. 14, checks the priorities of the values of the respective dimension conditions, and sorts the values of the respective dimension conditions in accordance with this dimension list.

In the dimension list of FIG. 14, the items listed higher have higher priorities. For example, "/person/personality/life event" has a higher priority than "/person/personality/current job", and where the paths representing a dimension are the same, "/person/personality/current job=sales" has a higher priority than "/person/personality/current job=software engineer".

Therefore, for "/person/personality/current job=sales" and "/person/personality/current industry=pharmaceuticals", the condition collation section 312 sorts such that "/person/personality/current job=sales" has a higher priority than "/person/personality/current industry=pharmaceuticals".

As a result, as illustrated in FIG. 15, the conditions are sorted into the order "/person/personality/life event=redundancy or corporate bankruptcy&&/person/personality/current job=sales", "/person/personality/current job=sales", "/person/personality/current industry=pharmaceuticals".

Next, the multidimensional ontology generation section 313 generates a multidimensional ontology in which dimension-classified ontologies are overlaid on the base ontology in accordance with the priorities in the dimension priority definition table (step S405).

Figure 16:
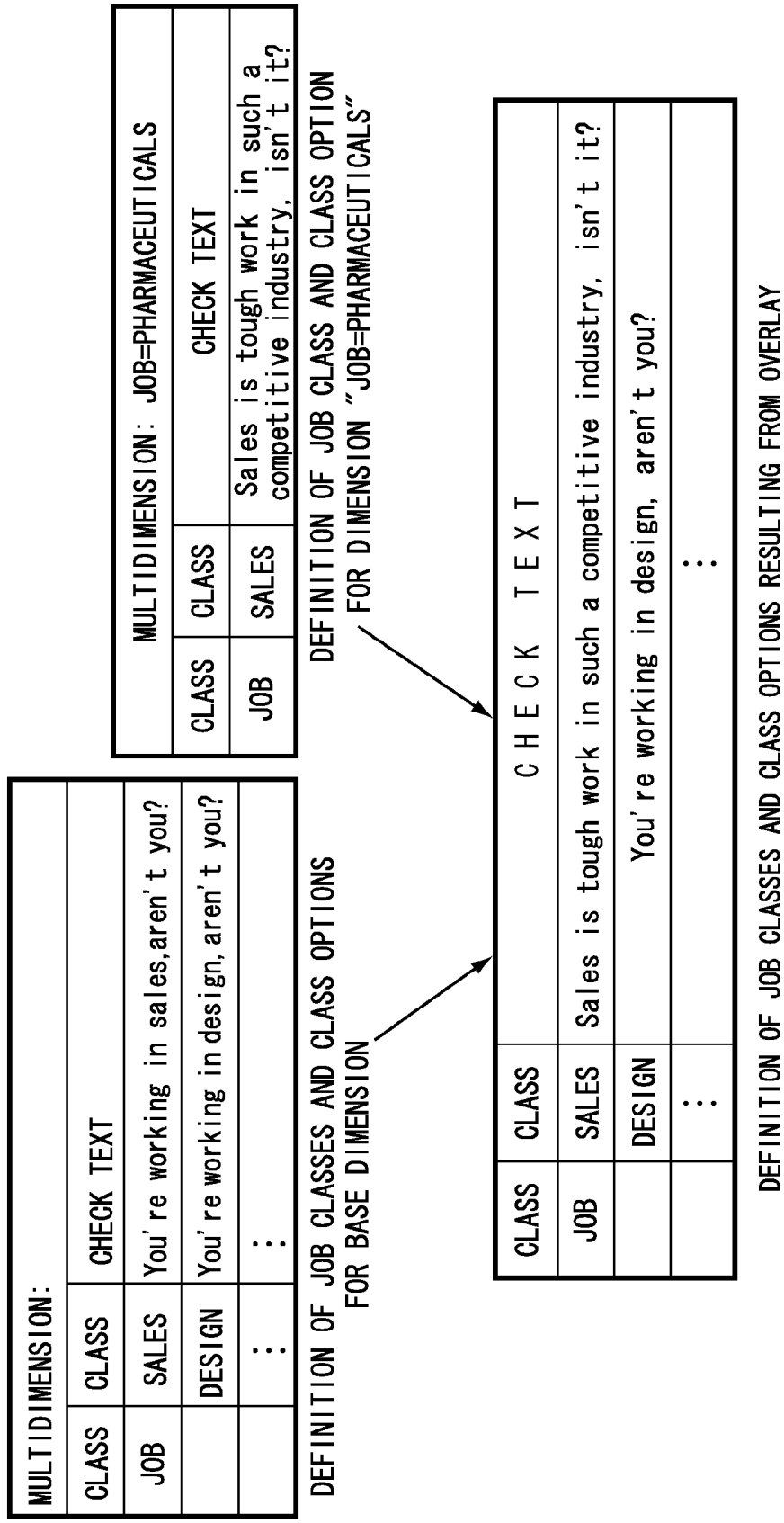
FIG. 16 is a descriptive diagram describing multidimensional ontology generation processing.

FIG. 16 is a descriptive diagram describing the multidimensional ontology generation processing. FIG. 16 shows job classes and class options defined in the base dimension and job classes and class options in the dimension "industry class=pharmaceuticals".

The multidimensional ontology generation section 313 overwrites the job classes and class options defined in the base dimension with the content of the job classes and class options in the dimension "industry=pharmaceuticals".

In this case, in the job classes of the base dimension in FIG. 16, the check text "Have you been working in sales?" is defined in the options of the class "job"—the class "sales". However, because of the overwriting in step S405, the check text of the options of the class "job"—the class "sales" is overwritten with "Sales is tough work in such a competitive industry, isn't it?".

Thus, according to multidimensional ontologies, the content of the class option definitions defined in a base dimension may be altered. Thus, check texts that are appropriate to, for example, the job of a user or the like may be outputted.

The multidimensional ontology generation section 313 outputs the generated multidimensional ontology to the dialogue control section 11 (step S406). Here, this generated multidimensional ontology is stored in the domain knowledge database 32.

(A-3-5) Inference processing

Secondly, details of the inference processing in step S304 of FIG. 10 in which the domain knowledge manager 31 performs output to the dialogue control section are described while referring to the drawings.

The meaning of the term "inference processing" herein is intended to include the inference of another value from an answer directly provided by a user. In general, when another value different from one value is inferred, inference must be performed taking both the one value and the other value into account, and suitable inference results might not be obtained. Accordingly, in the first embodiment, such processing in which plural answer results serve as conditions is carried out using multidimensional ontologies.

This inference processing (processing to convert inference definitions to multiple dimensions) may be described using FIG. 10 and FIG. 12, so is described while referring to FIG. 10 and FIG. 12.

FIG. 17A to FIG. 17C are descriptive diagrams describing structures of inference definitions that are defined in the domain knowledge database 32.

For example, FIG. 17A has an inference definition of the dimension "/person/personality/current company type=foreign company", in which a definition range for which inference processing is implemented is "/person/personality/current job", and a value range linked to by the inference is "/person/strong point/competencies".

In FIG. 17A, inference values for "IT skills", "English ability" and "negotiation ability" are defined for when the current job is "software engineer" and for when it is "sales".

For example, if the current job of a user employed by a foreign company is "software engineer", it may be imagined that IT skills and English ability are high. Accordingly, high inference values, "IT skills=0.7" and "English ability=0.8", are specified. On the other hand, it may be imagined that negotiation ability is not particularly high, and thus a low inference value "negotiation ability=0.2" is specified.

Similarly, if the current job of a user employed by a foreign company is "sales", it may be imagined that English ability and negotiation ability are high. Accordingly, high inference values, "English ability=0.9" and "negotiation ability=0.6", are specified. On the other hand, it may be imagined that IT skills are not particularly high. Accordingly, a low inference value, "IT skills=0.1", is specified.

FIG. 17B has an inference definition of the dimension "/person/personality/current company type=venture", in which the definition range for which inference processing is implemented is "/person/personality/current job", and the value range linked to by the inference is "/person/strong point/competencies".

For example, if the current job of a user employed by a venture business is "software engineer", it may be imagined that IT skills and negotiation ability are high. Accordingly, high inference values, "IT skills=0.9" and "negotiation ability=0.7", are specified. On the other hand, it may be imagined that English ability is not particularly high. Accordingly, a low inference value "English ability=0.2" is specified.

Similarly, if the current job of a user employed by a venture business is "sales", it may be imagined that negotiation ability is very high. Accordingly, a high inference value of, for example, "negotiation ability=0.9" is specified. On the other hand, it may be imagined that IT skills and English ability are not particularly high. Accordingly, low inference values, "IT skills=0.2" and "English ability=0.3", are specified.

FIG. 17C has an inference definition in the base dimension, in which the definition range for which inference processing is implemented is "/person/personality/current job", and the value range linked to by the inference is "/person/strong point/competencies".

The inference definitions in the base dimension in FIG. 17C are specified with, for example, respective inference values of "0.5" for IT skills, English ability and negotiation ability for the current jobs "software engineer" and "sales".

Figure 18A:
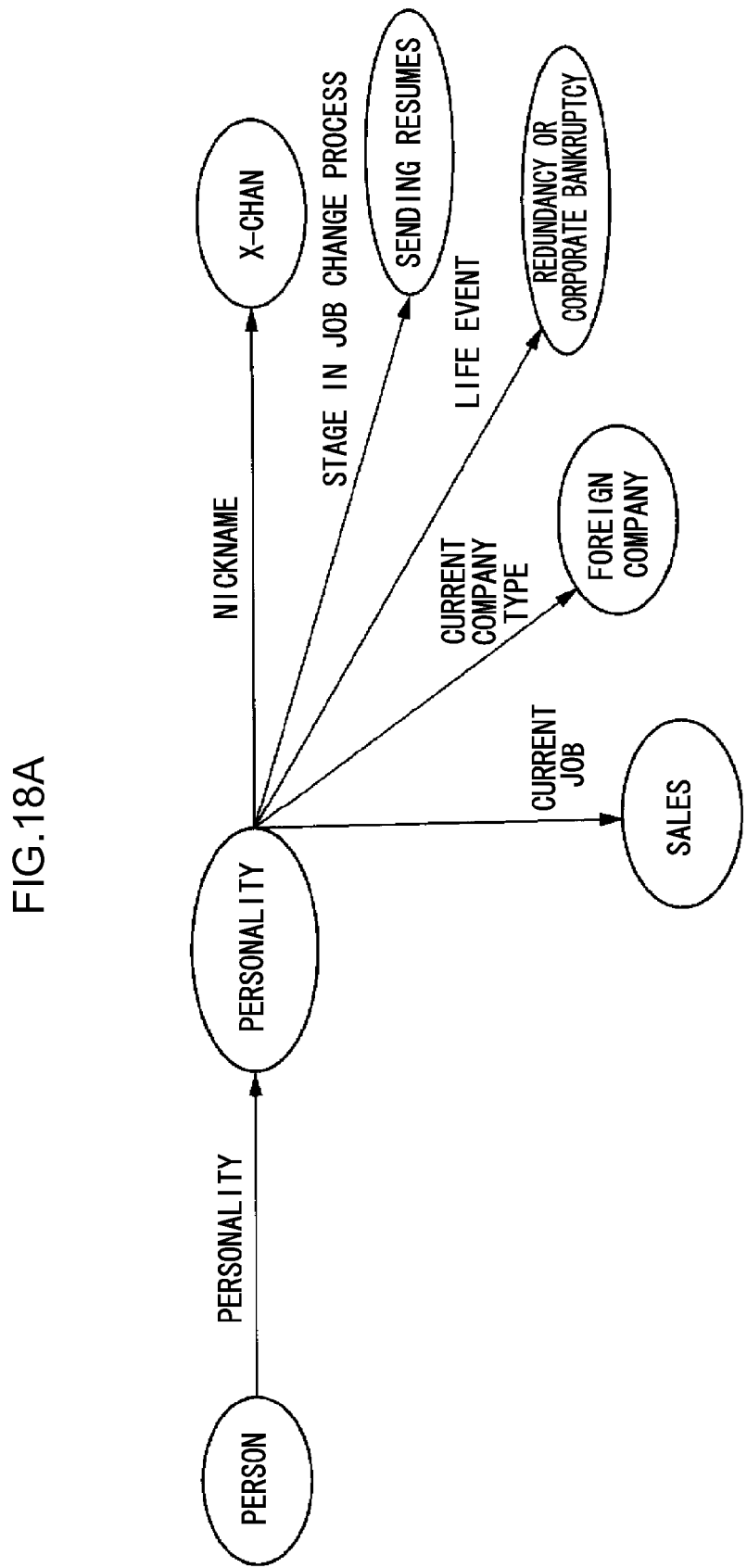
FIG. 18A is a descriptive diagram describing user data that is acquired by the domain knowledge manager (first).

The domain knowledge manager 31 acquires the user data illustrated in FIG. 18A as an intention analysis result in which "/person/personality/current job=sales" (S401).

Similarly to the dialogue control processing described in (A-3-4), the domain knowledge manager 31 collates the dimension conditions with the extended user data (S402), and sorts the dimension conditions in order of priority (S403).

Then, the domain knowledge manager 31 extracts only inference definitions that have "/person/personality/current job=sales" in the definition range (S404), overlays dimension-classified ontologies (inference definitions thereof in this case) with the base dimension ontology in accordance with the priority order of those inference definitions in the dimension priority definition table (S405), and generates a multidimensional ontology (of inference definitions) (S406).

Here, according to the user data of FIG. 18A, the inference definitions of the dimension "/person/personality/company type=foreign company" of FIG. 17A are written over the inference definitions of the base dimension of FIG. 17C to generate a multidimensional ontology. Thus, inference definitions with content exactly the same as in FIG. 17A are passed from the domain knowledge database 32 to the dialogue control section 11.

When the intention analysis result is "/person/personality/current job=sales", the dialogue control section 11 refers to the inference definitions of FIG. 17A, and extracts inference values for which the inference value if "current job=sales" working for a foreign company is at least a predetermined threshold (for example, 0.6).

Figure 18B:
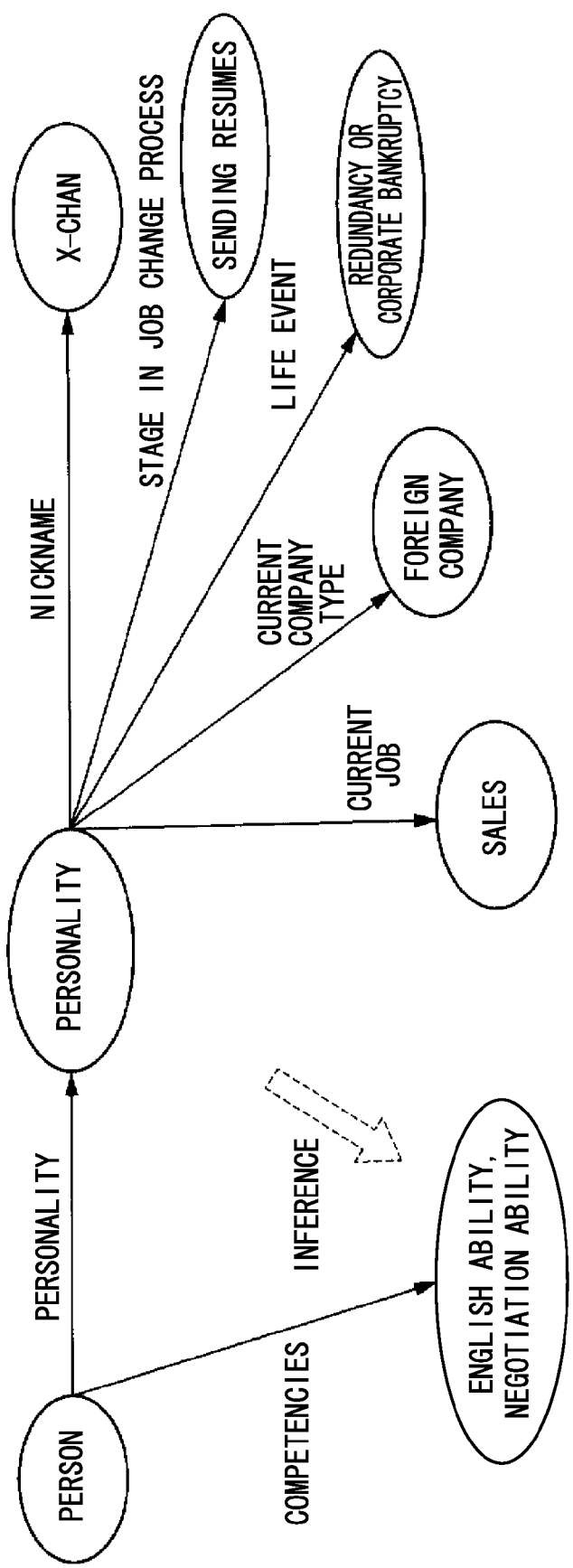
FIG. 18B is a descriptive diagram describing a state after inference of the acquired user data (second).

For example, in this case, "English ability=0.9" and "negotiation ability=0.6" are extracted. The dialogue control section 11 infers that inference values of at least the threshold (for example, 0.6) are strong points that can be used in the user's work. As illustrated in FIG. 18B, the dialogue control section 11 generates the class "English ability, negotiation ability" as a class for the property "competencies", and stores this in the user data.

Similarly, the domain knowledge manager 31 acquires the user data illustrated in FIG. 19A as an intention analysis result "/person/personality/current job=sales". According to the user data in FIG. 19A, because "/person/personality/current company type=venture", the inference definitions in FIG. 17B are generated by the multidimensional ontology generation processing for the inference definitions (S405).

Then, the dialogue control section 11 refers to the inference definitions in FIG. 17B given the intention analysis result "/person/personality/current job=sales", and extracts inference values for which the inference value of the case: "current job=sales" working for a venture is at least a predetermined threshold (for example, 0.6).

Figure 19B:
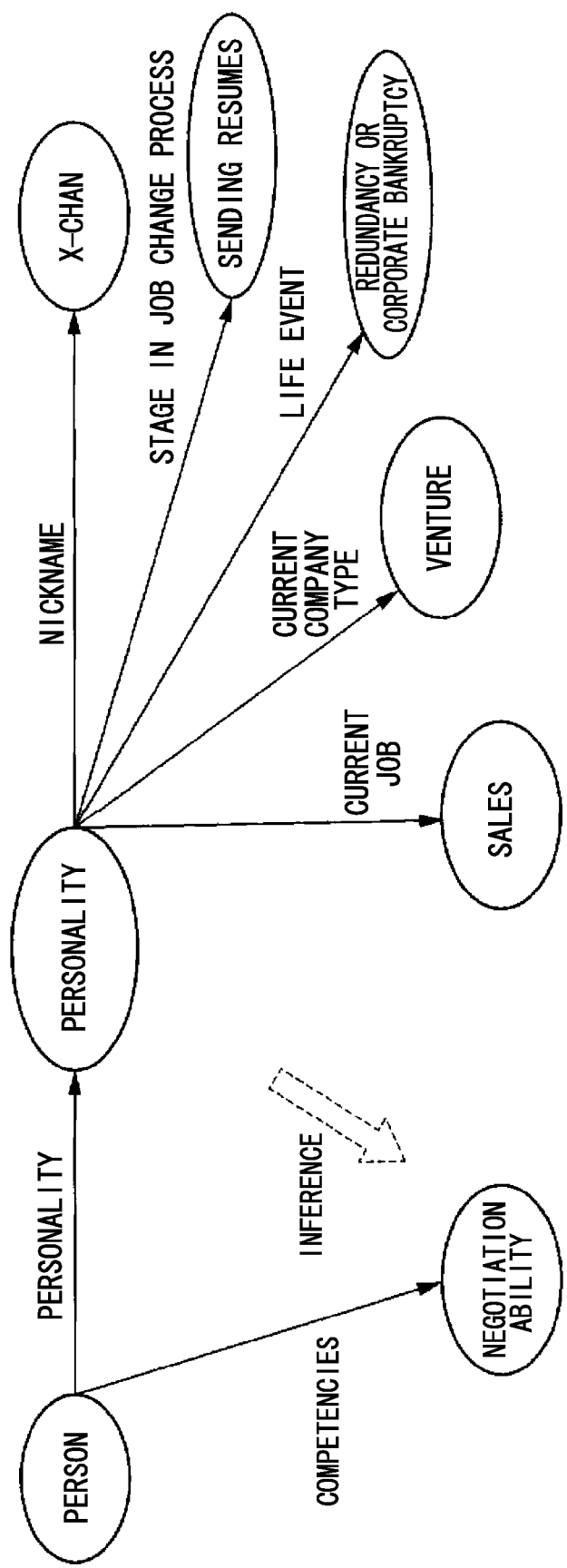
FIG. 19B is a descriptive diagram describing a state after inference of the acquired user data (second).

For example, in this case, "negotiation ability=0.9" is extracted. An inference section 33 infers that inference values of at least the threshold (for example, 0.6) are strong points that can be used in the user's work. As illustrated in FIG. 19B, the inference section 33 generates the class "negotiation ability" as a class for the property "competencies", and stores this in the user data.

Here, the inference results are generated as classes and stored in the user data. Therefore, if a check text is defined in the options of a class definition serving as an inference result, the domain knowledge manager 31 provides this check text (an inference check text) to the dialogue control section 11. The dialogue control section 11 sends this check text to the user.

(A-3-6) Processing to convert questions according to property definitions to multiple dimensions Thirdly, processing in which the domain knowledge manager 31 converts property definitions to multiple dimensions is described while referring to the drawings.

This processing to convert property definitions to multiple dimensions is described using FIG. 10 and FIG. 12, so is described here with reference to FIG. 10 and FIG. 12.

For example, the question that should be asked next differs between when the current job of the user is "software engineer" and when it is "sales". The dimensions for the respective jobs between which the questions should be changed in multidimensional ontologies have been plurally defined beforehand, and the property definitions that are to be referred to when the job is identified are sorted. Thus, suitable questioning may be carried out in accordance with the job of the user.

Firstly, the dialogue control section 11 provides definition range classes to the domain knowledge manager 31 in order to determine the next property of a current dimension, and the domain knowledge manager 31 acquires user data of the user from the user data management section 51 (step S301 and step S302).

Figure 20A:
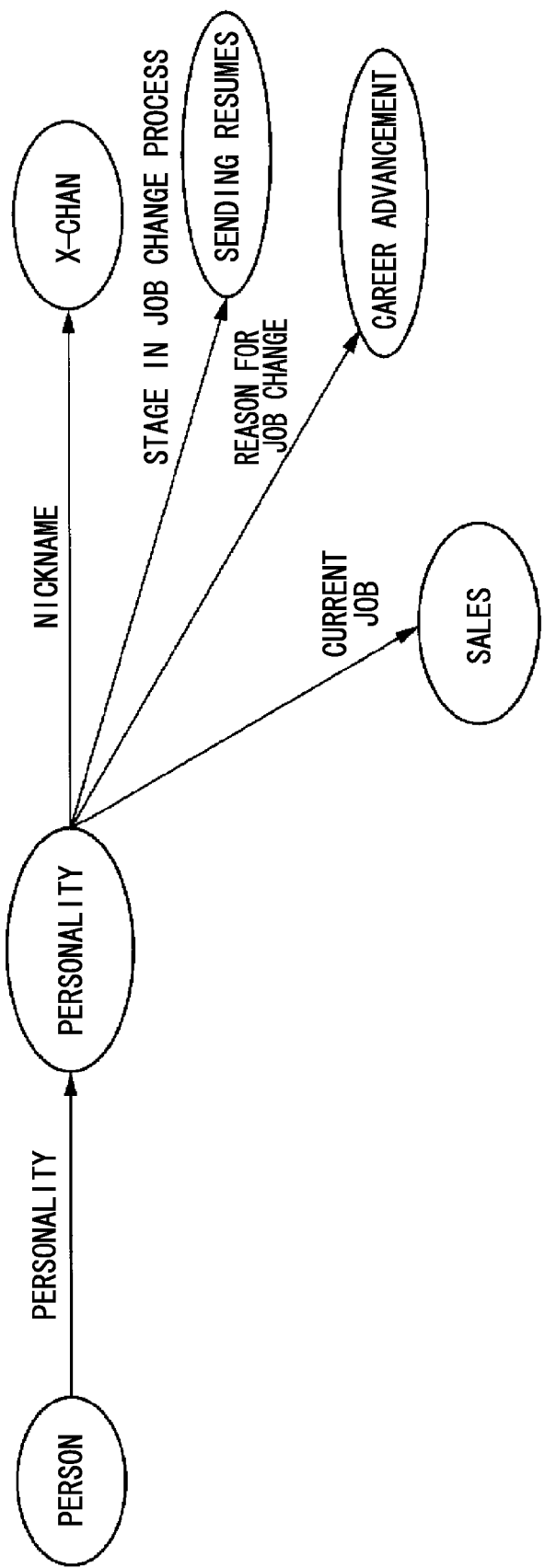
FIG. 20A is a descriptive diagram describing user data that is acquired by the domain knowledge manager of the first embodiment converting property definitions to multiple dimensions.
Figure 20B:
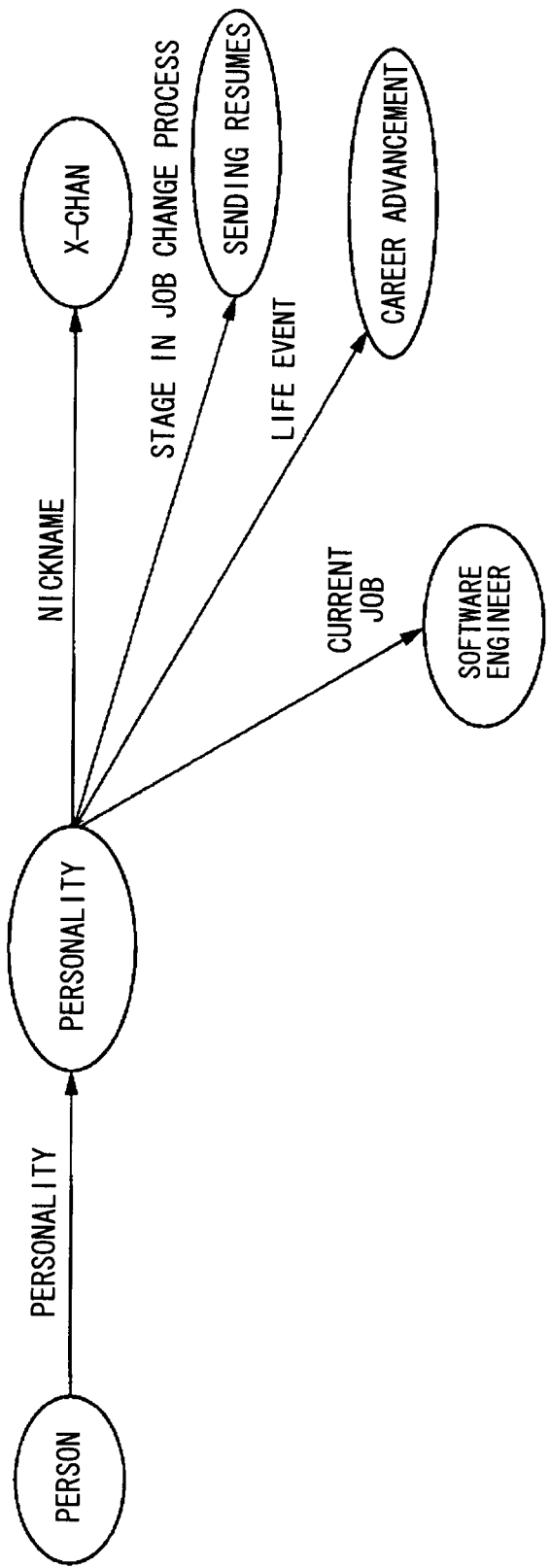
FIG. 20B is a descriptive diagram describing user data that is acquired by the domain knowledge manager of the first embodiment converting property definitions to multiple dimensions.

For example, the user data acquired by the domain knowledge manager 31 describes the case in FIG. 20A and the case in FIG. 20B.

FIG. 20A shows a case in which the current job of the user is "sales", and FIG. 20B shows a case in which the current job of the user is "software engineer". In both cases, the intention analysis result is "/person/personality/reason for job change"="career advancement", and the definition range class currently indicated by the pointer is the class "person".

The domain knowledge manager 31 creates a dimension priority definition table in accordance with steps S401 to S404 of FIG. 12.

In this case, the domain knowledge manager 31 overlays (overwrites) the dimension-classified property definitions on the property definitions of the base dimension in accordance with the priorities in the dimension priority definition table, converting the property definitions to multiple dimensions (step S405).

That is, in (A-3-4) a case of changing (overwriting to change) the class option definitions of the basic ontology, the base dimension, is illustrated. Here, by contrast, the property dimensions of the basic ontology of the base dimension are changed (overwritten to be changed).

Figure 21:
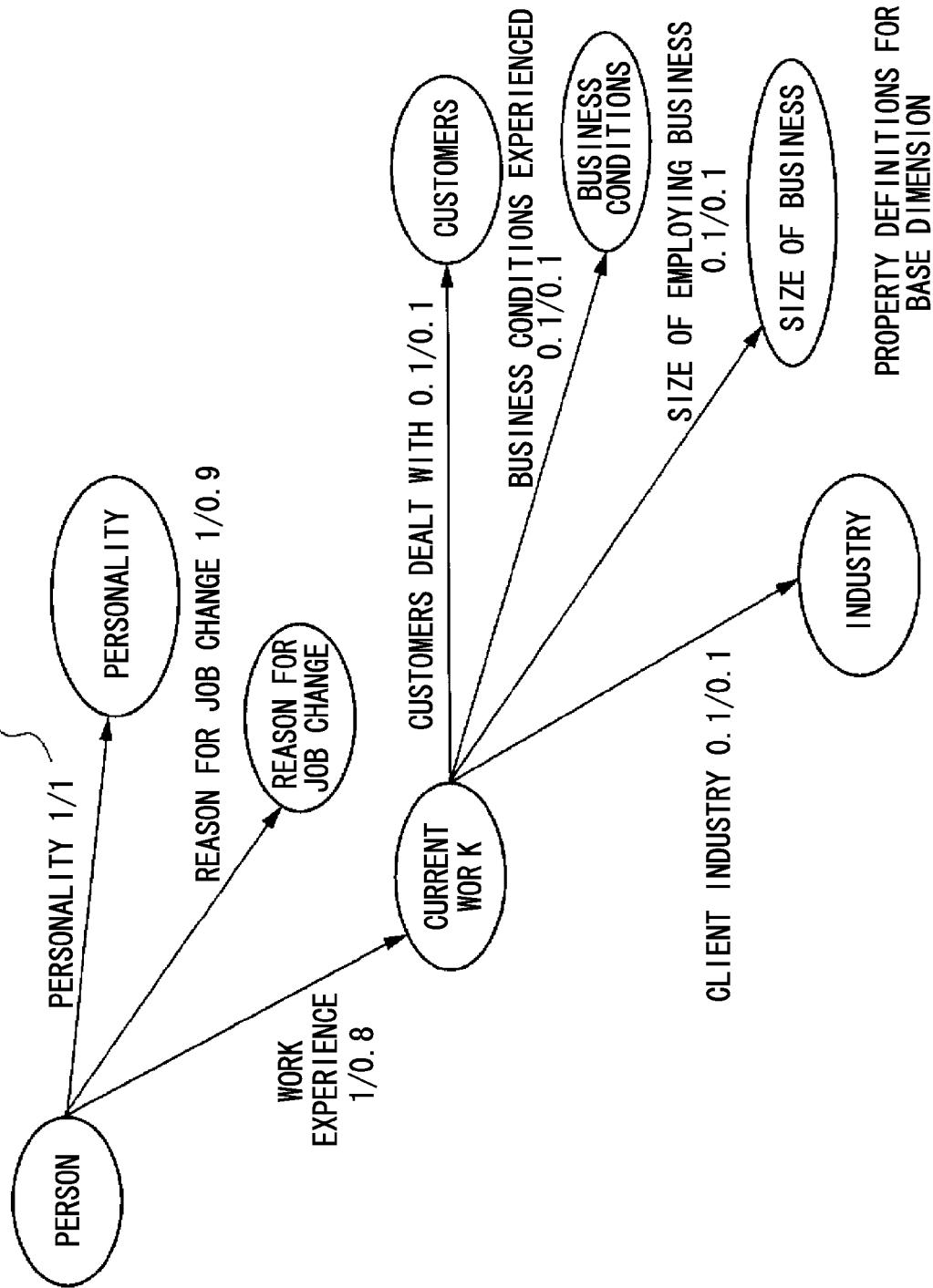
FIG. 21 is a descriptive diagram describing property definitions in a base dimension.

For example, FIG. 21 illustrates a structure of property definitions defined in the base dimension. FIG. 21 shows the property dimensions before the change, and corresponds to a portion of the property definitions illustrated in FIG. 5.

In FIG. 21, the lines joining the classes indicate property names and importance levels/priority levels. For example, "personality 1/1" indicates that the property name is personality, the importance level is 1 and the priority level is 1.

In the example of FIG. 20A and FIG. 20B, intentions have been analysed up to "/person/personality/reason for job change". Therefore, as illustrated in FIG. 20A and FIG. 20B, the property with the highest priority, "work experience", is selected next.

In FIG. 20A, the user data is "/person/personality/current job=sales". Therefore, the domain knowledge manager 31 acquires the property definitions of the dimension "/person/personality/current job=sales" from the domain knowledge database 32.

Figure 22:
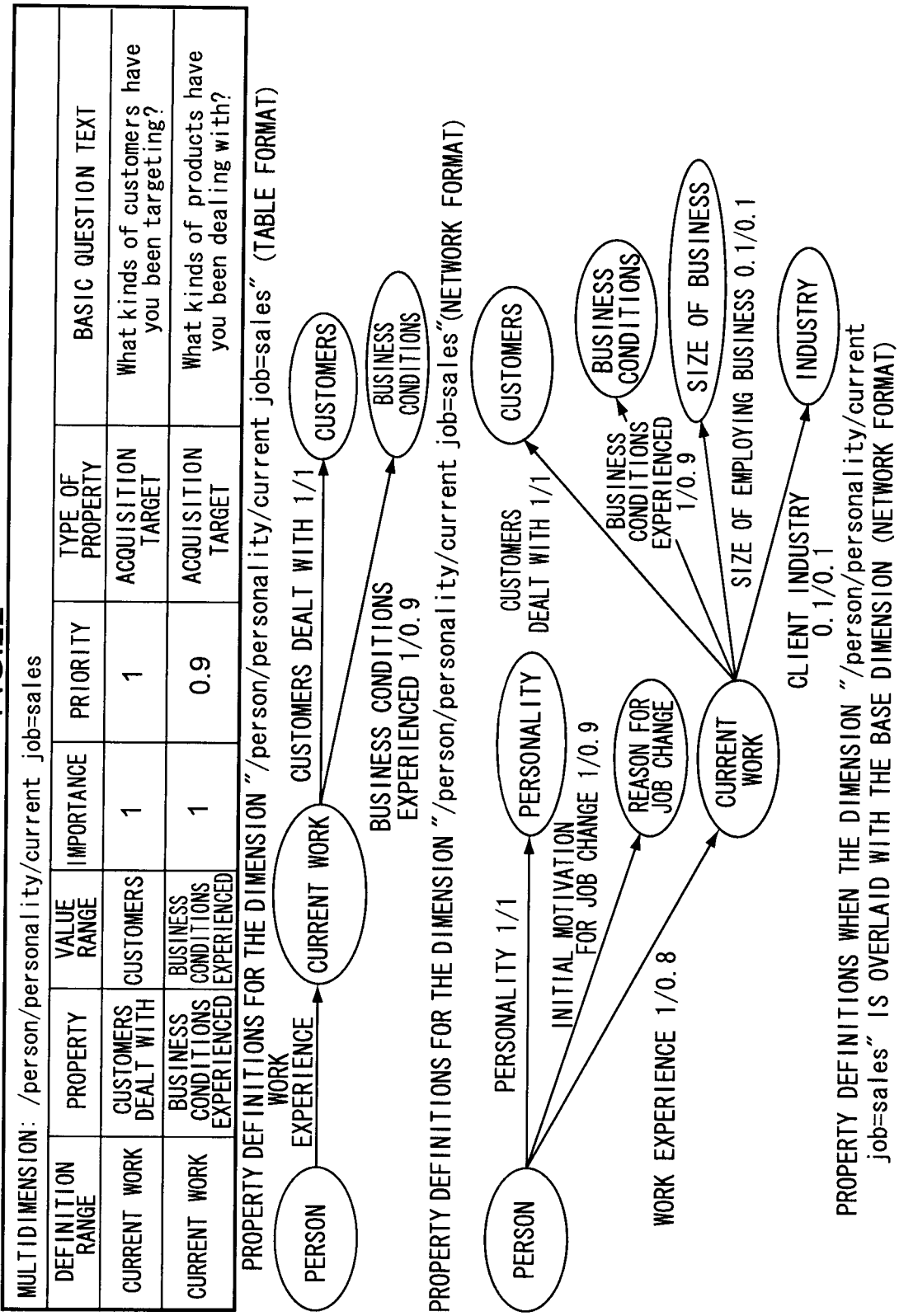
FIG. 22 is a descriptive diagram describing property definitions in the dimension "/person/personality/current job=sales".

FIG. 22 illustrates an example when the property definitions of the dimension "/person/personality/current job=sales" are in a table format and when the same are represented as a network, and illustrates an example of property definitions in which the base dimension illustrated in FIG. 21 and the dimension "/person/personality/current job=sales" are overlaid being represented as a network.

The property definitions illustrated in FIG. 22 are property definitions of the dimension "/person/personality/current job=sales". Accordingly, questions about customers who have been dealt with and business conditions that have been experienced are considered more important than the size of the employing business, the industries of clients and the like. Therefore, the importance and priority of the property "customers dealt with" are set to "1/1", and the importance and priority of the property "business conditions experienced" are defined as "1/0.9".

The multidimensional ontology generation section 313 overwrites the properties of the property definitions of the base dimension illustrated in FIG. 21 with the property definitions of the dimension "/person/personality/current job=sales" illustrated in FIG. 22. Thus, as illustrated in FIG. 22, property definitions in which the base dimension and the dimension "/person/personality/current job=sales" are overlaid are generated.

Hence, as the next question text for the user with the user data of FIG. 20A, the basic question text "What kinds of customers have you been targeting?" of the definition range "current work"—the property "customers dealt with"—the value range "customers" is outputted from the dialogue control section 11 (step S305).

As another example, in FIG. 20B, the user data is "/person/personality/current job=software engineer". Therefore, the domain knowledge manager 31 acquires the property definitions of the dimension "/person/personality/current job=software engineer" from the domain knowledge database 32.

Figure 23:
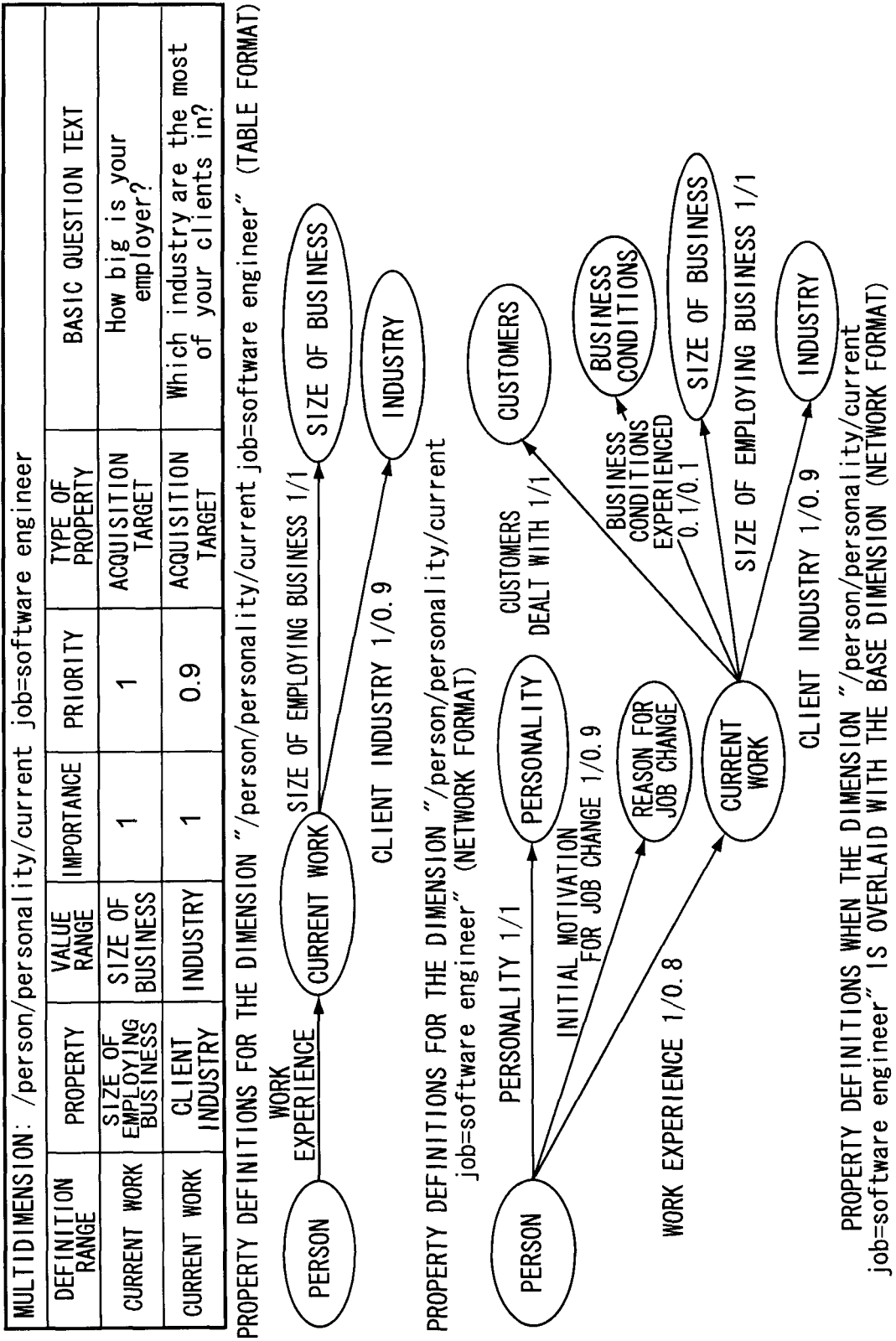
FIG. 23 is a descriptive diagram describing property definitions in the dimension "/person/personality/current job=software engineer".

FIG. 23 illustrates an example when the property definitions of the dimension "/person/personality/current job=software engineer" are in a table format and are represented as a network, and illustrates an example of property definitions in which the base dimension illustrated in FIG. 21 and the dimension "/person/personality/current job=software engineer" are overlaid being represented as a network.

The property definitions illustrated in FIG. 23 are the property definitions of the dimension "/person/personality/current job=software engineer". Accordingly, questions about the size of the employing business and industries of clients are considered more important than customers dealt with, business conditions experienced and the like. Therefore, the importance and priority of the property "size of employing business" are set to "1/1", and the importance and priority of the property "client industry" are defined as "1/0.9".

The multidimensional ontology generation section 313 overwrites the property definitions of the base dimension illustrated in FIG. 21 with the property definitions of the dimension "/person/personality/current job=software engineer" illustrated in FIG. 23. Thus, as illustrated in FIG. 23, property definitions in which the base dimension and the dimension "/person/personality/current job=software engineer" are overlaid are generated.

Hence, as the next question text for the user with the user data of FIG. 20B, the basic question text "How big is your employer?" of the definition range "current work"—the property "customers dealt with"—the value range "size of business" is outputted from the dialogue control section 11 (step S305).

(A-3-7) Link text output processing

Fourthly, link text output processing using the multidimensional ontology outputted by the dialogue control section 11 is described in detail while referring to the drawings.

This processing to convert basic question texts and link texts to multiple dimensions is described using FIG. 10 and FIG. 12, so is described here with reference to FIG. 10 and FIG. 12.

For example, the circumstances of the user are ascertained from the answers from the user, and the question that should be asked next differs in accordance with the circumstances of the user. Dimensions depending on circumstances of users have been plurally defined beforehand in a multidimensional ontology, and basic question texts and link texts may be sorted in accordance with the circumstances of a user.

Firstly, in order to decide on the next property of a current dimension, the dialogue control section 11 provides definition range classes to the domain knowledge manager 31. The domain knowledge manager 31 acquires user data of the user from the user data management section 51 (step S301 and step S302).

Figure 24:
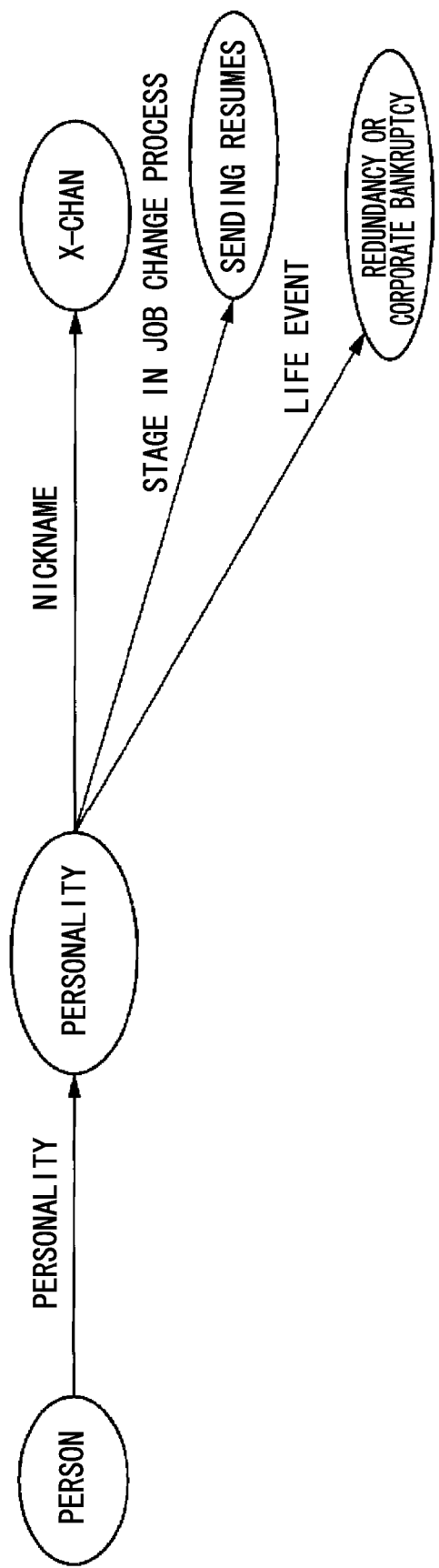
FIG. 24 is a descriptive diagram describing user data that is acquired by the domain knowledge manager of the first embodiment converting basic question texts and link texts to multiple dimensions.

For example, the user data acquired by the domain knowledge manager 31 describes the case in FIG. 24.

In FIG. 24, the intention analysis result is "/person/personality/life event=redundancy or corporate bankruptcy", and the definition range class currently indicated by the pointer is the class "personality".

The domain knowledge manager 31 creates a dimension priority definition table in accordance with steps S401 to S404 of FIG. 12.

At this time, the domain knowledge manager 31 overlays (overwrites) the dimension-classified property definitions on the property definitions of the base dimension in accordance with the priorities in the dimension priority definition table, converting the property definitions to multiple dimensions (step S405).

For example, the first table of FIG. 25 illustrates the structure of property definitions of a dimension "stage in job change process=sending resumes&&life event=redundancy or corporate bankruptcy&&age=40+".

The second table of FIG. 25 illustrates the structure of property definitions of a dimension "stage in job change process=sending resumes&&life event=redundancy or corporate bankruptcy".

The third table of FIG. 25 illustrates the structure of property definitions of the dimension with no conditions.

The domain knowledge manager 31 collates the user data illustrated in FIG. 23 with the first to third tables of FIG. 25. Dimension conditions that match the dimension conditions are "stage in job change process=sending resumes&&life event=redundancy or corporate bankruptcy"

Therefore, the property definitions of the dimension illustrated in the first table of FIG. 25 are not used.

However, dimension conditions that the user data in FIG. 24 does match are the dimension conditions of the second table of FIG. 25 and the third table of FIG. 25.

In the dimension priority definition table, dimensions with larger numbers of dimension conditions have higher priorities. Therefore, of the second and third tables of FIG. 25, the domain knowledge manager 31 selects the second table, with the higher priority, and overwrites the property definitions of the second table on the property definitions of the base dimension.

Hence, the dialogue control section 11 outputs the link text and basic question text described in the second table of FIG. 25 to the user (step S305).

That is, the dialogue control section 11 outputs a link text: "Hello X-chan. It seems that your current state in the job change process is that you have been sending out resumes. You are really working at finding a new job, aren't you? I see that you have mentioned redundancy or corporate bankruptcy. Thank you for letting me know about that. Now we should take stock of your abilities and strengths, and together we will look for some new possibilities."

Then, the dialogue control section 11 outputs a basic question text to the user: "First, could you tell me in more detail about the circumstances that led you to look for a new job?"

(A-3-8) Frequent expression subroutine

Lastly, frequent expression subroutine processing by the dialogue control section 11 is described while referring to the drawings.

The frequent expression subroutine is a subroutine that is initiated when a particular expression or class is acquired from user utterances more than a designated number of times.

Frequent expression subroutine definitions are stored in the domain knowledge database 32. FIG. 26 illustrates a structural example of a frequent expression subroutine definition. As illustrated in FIG. 26, the parameters of a frequent expression subroutine are: an SR (subroutine) name representing the name of a frequent expression class; a frequent expression character string list; and a frequency number.

First, the intention analysis section 20 analyses a user utterance text and checks whether it contains a frequent expression character string registered in the frequent expression character string list.

If a frequent expression character string is contained, the intention analysis section 20 counts up an expression frequency of the frequent expression character strings, and judges whether or not they exceed the frequency number defined in the frequent expression subroutine.

If the expression frequency of the frequent expression character string exceeds the frequency number, the intention analysis section 20 stores user data in the extended user data 53, as illustrated in FIG. 27.

For example, expressions such as "worried", "concerned", "nervous" and so forth are registered in the frequent expression character string list of the class "uncertain" in FIG. 26, and if these are expressed three or more times, the user data with the user data class name "uncertain" that is illustrated in FIG. 27 is stored in the extended user data 53 of the user data management section 51 (step S103).

When the class "state=uncertain" illustrated in FIG. 27 is stored in the extended user data 53, the domain knowledge manager 31 performs the following processing as dialogue control (step S104).

The dialogue control processing here follows the processing described in (A-3-4), but differs in that analysis results of the frequent expression subroutine act as dimension conditions in place of the intention analysis results of (A-3-4).

That is, the domain knowledge manager 31 generates a multidimensional ontology, overwriting the content of the base dimension class definition of "reason for job change"—"corporate bankruptcy" illustrated in FIG. 28B with the content of the class definition of the dimension "state=uncertain" illustrated in FIG. 28A.

Accordingly, in the end the check text defined in FIG. 28A is outputted. Here, if the class definition of the dimension "state=uncertain" has not been set, the class definition in FIG. 28B is not overwritten, so the check text defined in FIG. 28B is outputted.

(A-4) Effects of first embodiment

As described above, while static data is acquired and presented with a related art ontology, according to the first embodiment, because the multidimensional ontology is used, a semantic space may be switched from moment to moment in accordance with data acquired in a dialogue. Thus, a dynamic dialogue may be implemented.

According to the first embodiment, because the multidimensional ontology is used, responses and a dialogue flow that seem to fit well with the utterances of a user may be smoothed, and the levels of importance of matters that should be asked about in accordance with various changes in circumstance of the user may be changed from moment to moment.

Moreover, according to the first embodiment, because inference processing may be performed on the basis of data obtained from a user, as well as answers directly obtained from the user, actual intentions may be inferred from the answers of the user.

According to the first embodiment, because frequent expressions uttered many times by a user may be detected, the actual intentions of a user may be established and responses may be implemented accordingly.

According to the first embodiment, even if a large number of dimensions are specified (detailed conditions are specified), the ontology that is actually used is a single-layer ontology. Therefore, data may be accessed quickly.

(B) Other Embodiments (B-1) A multidimensional ontology is useful not just for a dialogue control system program but also for a system program that, in accordance with a mode in which an environment continuously changes, requires data to be assigned in accordance with the environment. Examples include expert systems equipped with inference engines, decision-making systems, agent systems and the like.

(B-2) In the first embodiment, an example that is provided with an intention analysis section for analysing user utterances is illustrated. However, an intention analysis section is not required. For example, the principles of operation are the same in a system in which a user selects options prepared beforehand by the system and the system switches between dimensions in accordance with selection results.

(B-3) In the first embodiment, an example is illustrated in which the values of the character texts, link texts and the like in the option definitions and the values of similarities to be used in inference definitions change in accordance with the dimensions is illustrated. However, any values may be changed in accordance with the dimensions. Class values themselves may change in accordance with dimensions (for example, the subclasses of a particular class may change between different dimensions).

(B-3) In (A-3-8) of the first embodiment, a frequency expression subroutine is illustrated, but this is not a limitation. For example, alert words may be used.

The invention claimed is:

1. An ontology processing system that performs predetermined processing using an ontology that systematically expresses domain knowledge representing concepts and relationships between concepts, the ontology processing system comprising:
   a dimension-classified ontology storage unit that stores at least one dimension-classified ontology, for each of dimensions for combinations of conditions, the dimension-classified ontologies differing in domain knowledge content;
   a basic ontology storage unit that stores a basic ontology including domain knowledge content for when there is no condition;
   a dimension priority storage unit that stores dimension priorities representing priorities of the respective dimensions;
   a dimension-classified ontology fetcher that, when a condition is specified, fetches from the dimension-classified ontology storage unit one or more dimension-classified ontologies that meet the specified condition;
   a multidimensional ontology generator that overwrites the content of the fetched dimension-classified ontologies onto the basic ontology according to the dimension priorities of the dimension priority storage unit, in order from the dimension-classified ontology with the lowest dimension priority, and generates a multidimensional ontology to be used with the specified condition; and
   a processer that performs predetermined processing using the multidimensional ontology generated by the multidimensional ontology generator.

2. The ontology processing system according to claim 1, wherein
the domain knowledge includes concepts and relationships between concepts, and dialogue progress information that specifies movement relationships from concepts employed in questions to concepts to be employed in subsequent questions, and
the predetermined processing includes determining questions for a user and implementing the questions, receiving user answers to the questions, deciding on concepts to be employed in subsequent questions on the basis of the multidimensional ontologies generated by the multidimensional ontology generator in accordance with conditions according to the user answers, and providing the questions to the user.

3. A non-transitory computer readable storage medium storing an ontology processing program that performs predetermined processing using an ontology that systematically expresses domain knowledge representing concepts and relationships between concepts, the ontology processing comprising:
storing, in a dimension-classified ontology storage unit, at least one dimension-classified ontology, for each of dimensions for combinations of conditions, the dimension-classified ontologies differing in domain knowledge content;
storing, in a basic ontology storage unit, a basic ontology including domain knowledge content for when there is no condition;
storing, in a dimension priority storage unit, dimension priorities representing priorities of the respective dimensions;
when a condition is specified, fetching from the at least one stored dimension-classified ontologies one or more dimension-classified ontologies that meet the specified condition;
generating a multidimensional ontology to be used with the specified condition, including overwriting the content of the fetched dimension-classified ontologies onto the basic ontology according to the stored dimension priorities, in order from the dimension-classified ontology with the lowest dimension priority; and
performing predetermined processing using the generated multidimensional ontology.

4. A dialogue control system that uses an ontology that systematically expresses domain knowledge representing concepts and relationships between concepts to be used in questions, determines questions for a user and implements the questions, receives user answers to the questions, and controls a dialogue in accordance with the user answers,
wherein the domain knowledge includes the concepts and relationships between concepts, and dialogue progress information that specifies movement relationships from concepts employed in questions to concepts to be employed in subsequent questions, and
the dialogue control system includes:
a dimension-classified ontology storage unit that stores at least one dimension-classified ontology, for each of dimensions for combinations of conditions, the dimension-classified ontologies differing in domain knowledge content;
a basic ontology storage unit that stores a basic ontology including domain knowledge content for when there is no condition;
a dimension priority storage unit that stores dimension priorities representing priorities of the respective dimensions;
a dimension-classified ontology fetcher that, when a concept in the user answers is specified as a condition, fetches from the dimension-classified ontology storage unit one or more dimension-classified ontologies that meet the specified condition;
a multidimensional ontology generator that overwrites the content of the fetched dimension-classified ontologies onto the basic ontology according to the dimension priorities of the dimension priority storage unit, in order from the dimension-classified ontology with the lowest dimension priority, and generates a multidimensional ontology to be used with the condition; and
a dialogue controller that decides on a concept to be employed in a subsequent question on the basis of the dialogue progress information of the multidimensional ontology generated by the multidimensional ontology generator, and provides the question to the user.

5. The dialogue control system according to claim 4, wherein
the domain knowledge specifies question texts for relationships between concepts, and
the dialogue controller outputs the question text specified for the concept to be employed in the subsequent question to the user.

6. The dialogue control system according to claim 4, wherein
the domain knowledge specifies at least check texts and link texts for relationships between concepts,
the multidimensional ontology generator dynamically changes the check texts and link texts by generating multidimensional ontologies with concepts in the user answers as conditions, and
the dialogue controller outputs the dynamically changed check texts and link texts to the user.

7. The dialogue control system according to claim 4, wherein
the basic ontology and the dimension-classified ontologies include inference definition information that infers concepts from other concepts,
the multidimensional ontology generator dynamically changes the inference definitions by generating multidimensional ontologies with concepts in the user answers serving as conditions, and
the dialogue controller infers concepts that correspond with concepts in the user answers on the basis of the dynamically changed inference definitions.

8. The dialogue control system according to claim 4, further comprising, preceding the dialogue controller, an intention analyser that performs analysis of intentions of the user from concepts in the user answers received in response to the questions implemented for the user.

9. The dialogue control system according to claim 8 wherein, if the intention analyser detects at least a predetermined number of repetitions of a particular expression or term on the basis of concepts in the user answers, the multidimensional ontology generator generates a multidimensional ontology with the particular expression or term serving as a condition.

10. A non-transitory computer readable storage medium storing a dialogue control program that uses an ontology that systematically expresses domain knowledge representing concepts and relationships between concepts to be used in questions, determines questions for a user and implements the questions, receives user answers to the questions, and controls a dialogue in accordance with the user answers,
wherein the domain knowledge includes the concepts and relationships between concepts, and dialogue progress information that specifies movement relationships from concepts employed in questions to concepts to be employed in subsequent questions, and the dialogue control includes:

storing, in a dimension-classified ontology storage unit, at least one dimension-classified ontology, for each of dimensions for combinations of conditions, the dimension-classified ontologies differing in domain knowledge content;

storing, in a basic ontology storage unit, a basic ontology including domain knowledge content for when there is no condition;

storing, in a dimension priority storage unit, dimension priorities representing priorities of the respective dimensions;

when a concept is specified as a condition in the user answers, fetching from the at least one stored dimension-classified ontologies one or more dimension-classified ontologies that meet the specified condition;

generating a multidimensional ontology to be used with the condition, including overwriting the content of the fetched dimension-classified ontologies onto the basic ontology according to the stored dimension priorities, in order from the dimension-classified ontology with the lowest dimension priority; and deciding on a concept to be employed in a subsequent question on the basis of the dialogue progress information of the generated multidimensional ontology, and providing the question to the user.

11. An ontology processing method that performs predetermined processing using an ontology that systematically expresses domain knowledge representing concepts and relationships between concepts, the ontology processing method comprising:

storing, in a dimension-classified ontology storage unit, at least one dimension-classified ontology, for each of dimensions for combinations of conditions, the dimension-classified ontologies differing in domain knowledge content;

storing, in a basic ontology storage unit, a basic ontology including domain knowledge content for when there is no condition;

storing, in a dimension priority storage unit, dimension priorities representing priorities of the respective dimensions;

when a condition is specified, fetching from the at least one stored dimension-classified ontologies one or more dimension-classified ontologies that meet the specified condition;

generating a multidimensional ontology to be used with the specified condition, including overwriting the content of the fetched dimension-classified ontologies onto the stored basic ontology according to the stored dimension priorities, in order from the dimension-classified ontology with the lowest dimension priority; and performing predetermined processing using the generated multidimensional ontology.

12. A dialogue control processing method that uses an ontology that systematically expresses domain knowledge representing concepts and relationships between concepts to be used in questions, determines questions for a user and implements the questions, receives user answers to the questions, and controls a dialogue in accordance with the user answers, wherein the domain knowledge includes the concepts and relationships between concepts, and dialogue progress information that specifies movement relationships from concepts employed in questions to concepts to be employed in subsequent questions, and the dialogue control includes:

storing, in a dimension-classified ontology storage unit, at least one dimension-classified ontology, for each of dimensions for combinations of conditions, the dimension-classified ontologies differing in domain knowledge content;

storing, in a basic ontology storage unit, a basic ontology including domain knowledge content for when there is no condition;

storing, in a dimension priority storage unit, dimension priorities representing priorities of the respective dimensions;

when a concept is specified as a condition in the user answers, fetching from the at least one stored dimension-classified ontologies one or more dimension-classified ontologies that meet the specified condition;

generating a multidimensional ontology to be used with the condition, including overwriting the content of the fetched dimension-classified ontologies onto the basic ontology according to the stored dimension priorities, in order from the dimension-classified ontology with the lowest dimension priority; and deciding on a concept to be employed in a subsequent question on the basis of the dialogue progress information of the generated multidimensional ontology, and providing the question to the user.

\* \* \* \* \*